United States Patent
Poggio et al.

(10) Patent No.: US 6,525,744 B1
(45) Date of Patent: Feb. 25, 2003

(54) CORRESPONDENCE BETWEEN N-DIMENSIONAL SURFACE: VECTOR FIELDS THAT ARE DEFINED BY SURFACES AND THAT GENERATE SURFACES WHICH PRESERVE CHARACTERISTICS OF THE DEFINING SURFACES

(75) Inventors: Tomaso Poggio, Wellesley, MA (US); Christian R. Shelton, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/266,429

(22) Filed: Mar. 11, 1999

(51) Int. Cl.$^7$ ................................. G09G 5/00
(52) U.S. Cl. ................... 345/619; 345/646; 345/647
(58) Field of Search .................. 345/420, 433, 345/473, 419, 423, 427, 428, 619, 646, 647; 382/308

(56) References Cited

U.S. PATENT DOCUMENTS

| | | | | |
|---|---|---|---|---|
| 5,590,261 A | * | 12/1996 | Sclaroff et al. | 395/173 |
| 5,745,668 A | | 4/1998 | Poggio et al. | 395/175 |
| 5,774,129 A | | 6/1998 | Poggio et al. | 35/441 |
| 5,933,150 A | * | 8/1999 | Ngo et al. | 345/473 |
| 6,100,893 A | * | 8/2000 | Ensz et al. | 345/420 |
| 6,147,692 A | * | 11/2000 | Shaw et al. | 345/433 |
| 6,250,928 B1 | * | 6/2001 | Poggio et al. | 345/473 |

OTHER PUBLICATIONS

In re Warmerdam, U.S. Court of Appeals Federal Circuit, 31 USPZ2d 1754.*

Heckbert, Paul, and Garland, Michael, Survey of Polygonal Surface Simplification Algorithms, School of Computer Science, Carnegie Mellon University, Pittsburg, PA 15213, May 1, 1997.

* cited by examiner

Primary Examiner—Mark Zimmerman
Assistant Examiner—Enrique L Santiago
(74) Attorney, Agent, or Firm—Gordon E. Nelson

(57) ABSTRACT

Techniques for finding a correspondence between a source object and a target object, the objects having n>2 dimensions, such that a vector field based on the correspondence generates objects which tend to preserve the characteristics of both the source object and the target object. The techniques result in vector fields which maximize the generated object's similarity to the target object while minimizing structural changes to the source object. Minimization of structural changes is done by associating directional spring functions with points in the source object and finding a vector which generates an object for which changes in the directional spring functions are minimized. Further included are techniques for reducing the computational cost of finding a correspondence by making a set of pairs of increasingly-simplified representations of the source object and the target object and then finding pair vector fields for the pairs, beginning with the most simplified pair and ending with the original representations of the source object and the target object. The increasingly-simplified representations have the property that they preserve the large-scale structure of the original representations of the source object and the target object. The pair vector field for a given pair is found by extending the pair vector field found for the next simpler pair so that it applies to the pair's source object and then using the extended pair vector field as the initial vector field in finding the pair vector field. The techniques may be applied to images and to surfaces in which color is represented by means of additional dimensions. Vector fields found using the techniques may be used to generate objects belonging to a class of objects defined by the source object and at least the target object.

44 Claims, 17 Drawing Sheets

CORRESPONDENCE BETWEEN N-DIMENSIONAL SURFACE: VECTOR FIELDS THAT ARE DEFINED BY SURFACES AND THAT GENERATE SURFACES WHICH PRESERVE CHARACTERISTICS OF THE DEFINING SURFACES

STATEMENT REGARDING FEDERALLY-SPONSORED RESEARCH

This invention was made with government support under Grant Number N00014-96-1-0342 awarded by the Navy and Grant Number ASC-9217041 awarded by the National Science Foundation. The government has certain rights in the invention.

BACKGROUND OF THE INVENTION

1. Field of the Invention

The field of the invention is computer graphics and digital imaging generally and more specifically the generation of surfaces that belong to a class of surfaces.

2. Description of the Prior Art

When an object can be described by means of dimensional coordinates, a second object can be described using the coordinates of a first object and a description of a transformation by means of which the coordinates of the first object can be transformed into coordinates describing the second object. FIG. 1 shows a simple example: curve 101 may be described by means of the coordinates of a set of points; shown are the points {a, b; c, d; e, f; g, h; i, j}. Curve 103 is described relative to curve 101 by the points {a+8, b;c+2,d;e, f;g+2,h;i+8,j}. It may also be described relative to curve 101 by means of the points of curve 101 and a vector field which describes the offsets that have to be added to the coordinates of the points making up curve 101 to obtain curve 103; for the points a,b through i,j, vector field 106 has the values (8,0), (2,0), (0,0), (2,0), (8,0). As can be seen from the foregoing, vector field 106 is based on a correspondence between the points {a,b;c,d;e,f;g,h;i,j} of curve 101 and the points {a+8,b;c+2,d;e,f;g+2,h;i+8,j} of curve 103. In many cases, a vector field that describes how one object must be transformed to become a second object requires far fewer bits than a complete description of the second object, and vector fields are thus much used in computer graphics and digital imaging generally to save data storage space and/or network bandwidth.

When a vector field expresses a relationship between a first object and a second object, as it does with curves 101 and 103 of FIG. 1, the description of the first object and the vector field can be used to derive other objects that belong to a class of objects defined by the first object and the second object. In FIG. 1, three curves, 105, 107, and 109 are shown in dashed lines. These curves are different from, but clearly related to curves 101 and 103. In some sense, they have characteristics that are defined by the characteristics of curves 101 and 103. Each of the curves is generated by multiplying vector field A 106 by a fractional constant; with curve 105, the constant is ¾; with curve 106, it is ½; with curve 109, it is ¼. It should be noted here that other curves that are related to curves 101 and 103 may be produced by multiplying vector field A 106 by constants whose values are outside the range [0,1].

Thus, in general, if one wants to generate a set of objects whose characteristics are defined by a first object and a second object, one can do so by making descriptions of the two objects, finding a vector field which, when applied to the first object, transforms the first object into an object that is similar to the second object, and then creating each object in the set of objects by manipulating the vector field and then applying the manipulated vector field to the first object to create the desired object. The technique is further not limited to two objects: the first object may have vector fields that describe transformations into a number of other objects, and objects belonging to the class defined by the first object and the other objects may be generated by combining the transformations specified in the vectors.

Objects generated by manipulating the vector field have many uses. For example, in image recognition systems, an image that is to be recognized must be compared with an example image; the image to be recognized is often a variation on the example image. For instance, the example image may be a photograph showing a smiling face; the image to be recognized may be frowning; by using vector fields as described above, the smiling face of the example image may be transformed into a frowning image and that image may be compared with the image to be recognized. Another use of such objects is what is termed "morphing", that is, a sequence of images such that a first image turns gradually into a second image. If one has a vector field which transforms the first image into the second image, the sequence of images required to morph the first image into the second image can be made by manipulating the vector field and applying the manipulated vector field to the first image. For example, the vector field manipulation of FIG. 1 could be seen as morphing the "frown" of curve 101 into the "smile" of curve 103 via curves 109, 107, and 105.

The chief problem with generating sets of objects in this fashion is finding the vector field. One source of difficulty is automatically determining at all which vector field produces the "best" family of objects, that is, produces the family of objects that makes the smoothest transition between the first object and the second object; another source of difficulty is the computational cost of such a determination.

Where the objects are images, the vector fields are termed optical flows. For details on optical flows, see J. L. Barron, et al., "Performance of optical flow techniques", in *Proceedings of the IEEE Conference on Computer Vision and Pattern Recognition*, pp. 236–242, Champaign, Ill., 1992. Solutions for the problems of determining which vector field produces the best family of objects and for reducing the computational cost of such a determination when the objects are images are described in U.S. Pat. No. 5,745,668, Poggio, et al., Example-based image analysis and synthesis using pixelwise correspondence, issued Apr. 28, 1998, which is hereby incorporated by reference into the present patent application.

Images are, however, two-dimensional objects. Finding the best vector field with objects that are described using more than two dimensions presents further problems. In the following, an object that is described using more than two dimensions will be termed a surface. The problems of finding a vector field that can be applied to a given surface to generate members of a class of surfaces that is defined by two or more surfaces include the following:

- finding a correspondence between the source and target objects upon which a vector field can be based that generates objects which preserves the characteristics of both the source surface and the target surface;
- finding a way of quantifying correspondences between objects; and
- finding a way to reduce the computational cost of finding the correspondences and thereby of finding the vector field.

It is an object of the present invention to overcome these problems and thereby make it possible to generate sets of surfaces that belong to a class defined by a first surface and one or more other surfaces from a description of the first surface and vector fields that describe how the first surface can be transformed into the other surfaces.

SUMMARY OF THE INVENTION

The problem of finding a correspondence is solved by defining the correspondence in terms of similarity to the target surface and amount of distortion of the source surface. In one aspect of the techniques, the distortion is measured by applying functions that measure structural changes to the source surface. In a preferred embodiment, the functions are directional spring functions for pairs of points in the source surface, the directional spring functions having the property that they respond to changes in distance and/or direction of the points relative to each other. In a further aspect of the techniques, the surfaces are represented by triangular meshes and the directional spring functions are applied to vertices that are adjacent to a given vertex in the triangular mesh and to any other vertex that is closer to the given vertex than the given vertex's most distant adjacent vertex.

The computational cost of finding the correspondence is reduced by first producing pairs of increasingly simplified representations of the source surface and the target surface, the simplified representations having the property that they tend to preserve large-scale structural features of the source and target surfaces, and then using the pairs in order of decreasing simplification to find the correspondence. In a further aspect of this technique, a pair vector field found for each pair of simplified representations tends to preserve the features of both the pair's source representation and the pair's target representation. In another aspect, the pair vector field found for one pair is extended for the next less simplified pair and is used as the initial vector field in finding the pair vector field for the next less simplified pair. The least-simplified pair of representations are those for the original source surface and the original target surface and the pair vector field for the original source surface and the original target surface is the vector field for the original source surface and the original target surface.

The vector fields made using the foregoing techniques may be applied to a representation of the source surface to generate member surfaces of a class of surfaces which is defined by at least the source surface and the target surface.

Other objects and advantages will be apparent to those skilled in the arts to which the invention pertains upon perusal of the following Detailed Description and drawing, wherein:

Figure 1:
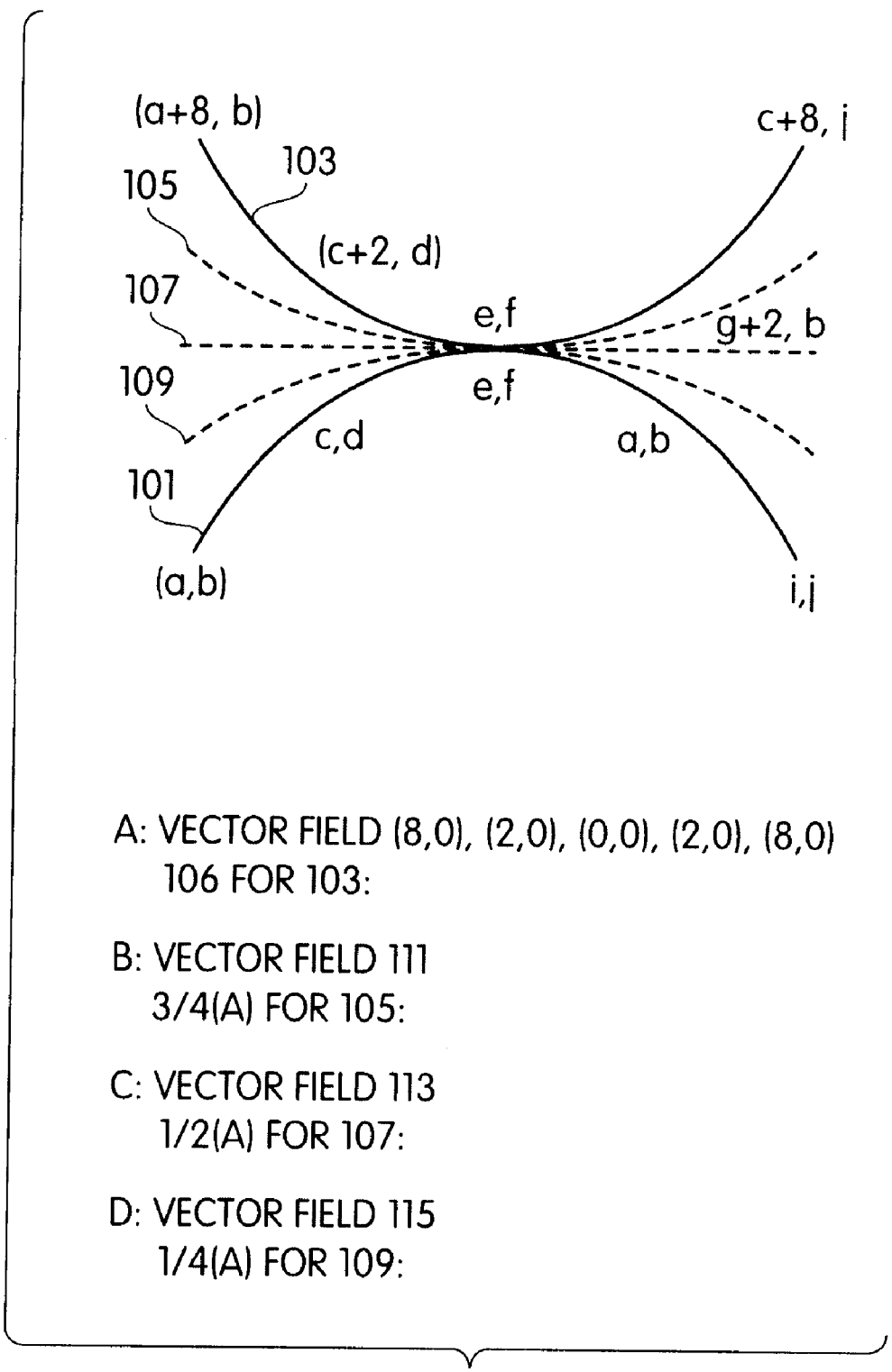
FIG. 1 is an example of transformation of a curve using a vector field.

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION

The following Detailed Description will first provide an overview of a method whereby a vector field which may be used to generate a class of surfaces may be automatically produced; thereupon, it will describe a system in which the method may be practiced, as well as an example of the use of the method. Thereupon, the problems of determining which of a set of surfaces corresponds most closely to a given surface will be described in detail and an overview of solutions to those problems will be presented. Finally, the solutions employed in a preferred embodiment will be described in detail.

Automatically Producing a Vector Field that Can Be Used to Generate a Class of Surfaces As explained in the Description of the prior art, two objects, a source object and a target object, may define a class of objects. Objects belonging to the class defined by the source object and the target object may be generated by finding a vector field which, when it is applied to the source object produces the target object, and then applying modified versions of the vector field to the source object to generate other objects belonging to the class. A vector field is based on a correspondence between the source object and the target object, that is, points on the source object are associated with points on the target object and the vector field expresses how the positions of the points on the source object are modified to obtain the positions of the associated points on the target object. With objects of any complexity, there are of course many possible correspondences and accordingly many possible vector fields. Not all of the vector fields, however, are equally good for generating sets objects belonging to the class. A vector field which is used for this purpose must have the property that when it is modified to generate objects belonging to the class, the objects generated by the modified vector field tend to preserve the characteristics of both the source object and the target object. In order to find such a vector field, one must of course find the proper correspondence between the points of the source object and the target object.

Figure 19:
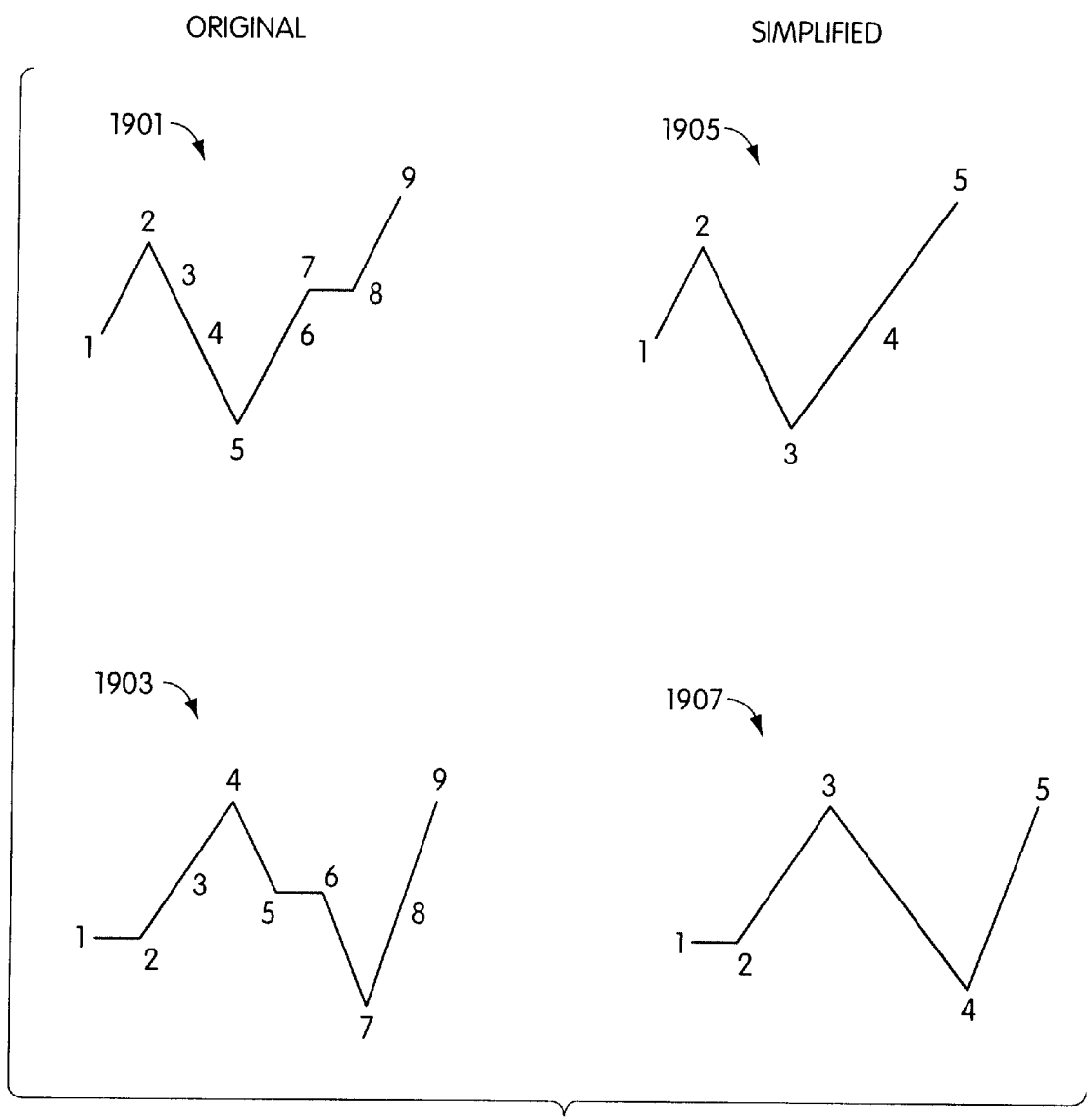
FIG. 19 is an example of the correspondence problem

Finding such a correspondence when the objects are surfaces, that is, are represented by the use of more than two dimensions, is a computationally daunting task. FIG. 19 illustrates a simple version of the problem. In FIG. 19, the original source surface is 1903 and the original target surface is 1901. Nine points 1901(1 . . . 9) and 1903(1 . . . 9) are shown on each surface. A human faced with the problem of determining how the points on surfaces 1901 and 1903 best corresponded to each other would determine that the peak indicated by 2 in surface 1901 matched the peak indicated by 4 in surface 1903 and the valley indicated by 5 in surface 1901 matched with the valley indicated by 7 in surface 1903. Once this determination has been made, it is clear that the points on the surfaces match as follows:

| 1901 | 1903 |
| --- | --- |
| 1 | 1 |
| 2 | 4 |
| 3 | 5 |
| 4 | 6 |
| 5 | 7 |
| 6 | 7–8 |
| 7 | 7–8 |
| 8 | 8 |
| 9 | 9 |

A vector field which is going to warp surface 1901 to produce a class of objects that preserve the characteristics of both surface 1901 and 1903 must be based on the correspondence shown in the table. The reason for this is that the correspondence in the table permits a vector field which modifies the structure of surface 1901 to the smallest extent possible in warping it to match surface 1903. In so doing, it has maintained the properties of surface 1901 to the greatest extent possible while producing a surface similar to surface 1903.

Finding a way of finding the correspondence between the points of surfaces 1901 and 1903 that yields the best vector field is not difficult for humans, since they can see the entirety of both surfaces at once. It is far more difficult for machines, since they cannot. For example, for a machine, 1901(7) might seem a good match for 1903(5) and 1901(8) a good match for 1903(6), since both pairs of points are connected by a horizontal line. However, the correspondence resulting from such a match misses the structurally more important matches between 1901(2) and 1903(4) and 1901(5) and 1903(7), and a vector field based on a correspondence in which 1901(7) matched 1903(5) and 1901(8) matched 1903(5) would have to drastically distort the part of surface 1901 containing points (2 . . . 9) to produce a surface similar to surface 1903 and would consequently not produce a class of surfaces which preserved the properties of both surface 1901 and surface 1903.

One way of making the problem of finding the best correspondence between the points on the surfaces easier is to simplify the surfaces so that complexities such as the irregularity 1901(7,8) vanish. Of course, the simplification must be done in such a way that the large-scale structural properties of the surfaces are maintained. A simplification which has this effect is shown in the "simplified" column. There, surface 1901 has been simplified to 1905, which has half as many points to match, and surface 1903 has been simplified to 1907, which again has half as many points to match. With these simplifications, even a machine should have no trouble recognizing that the best correspondence matches points as follows:

| 1905 | 1907 |
| --- | --- |
| 1 | 1 |
| 2 | 3 |
| 3 | 4 |
| 4 | 4–5 |
| 5 | 5 |

Finding the best correspondence between 1901 and 1903 becomes much easier when the search for it is restricted by beginning with the matches between points obtained by finding the correspondence between 1905 and 1907.

Figure 2:
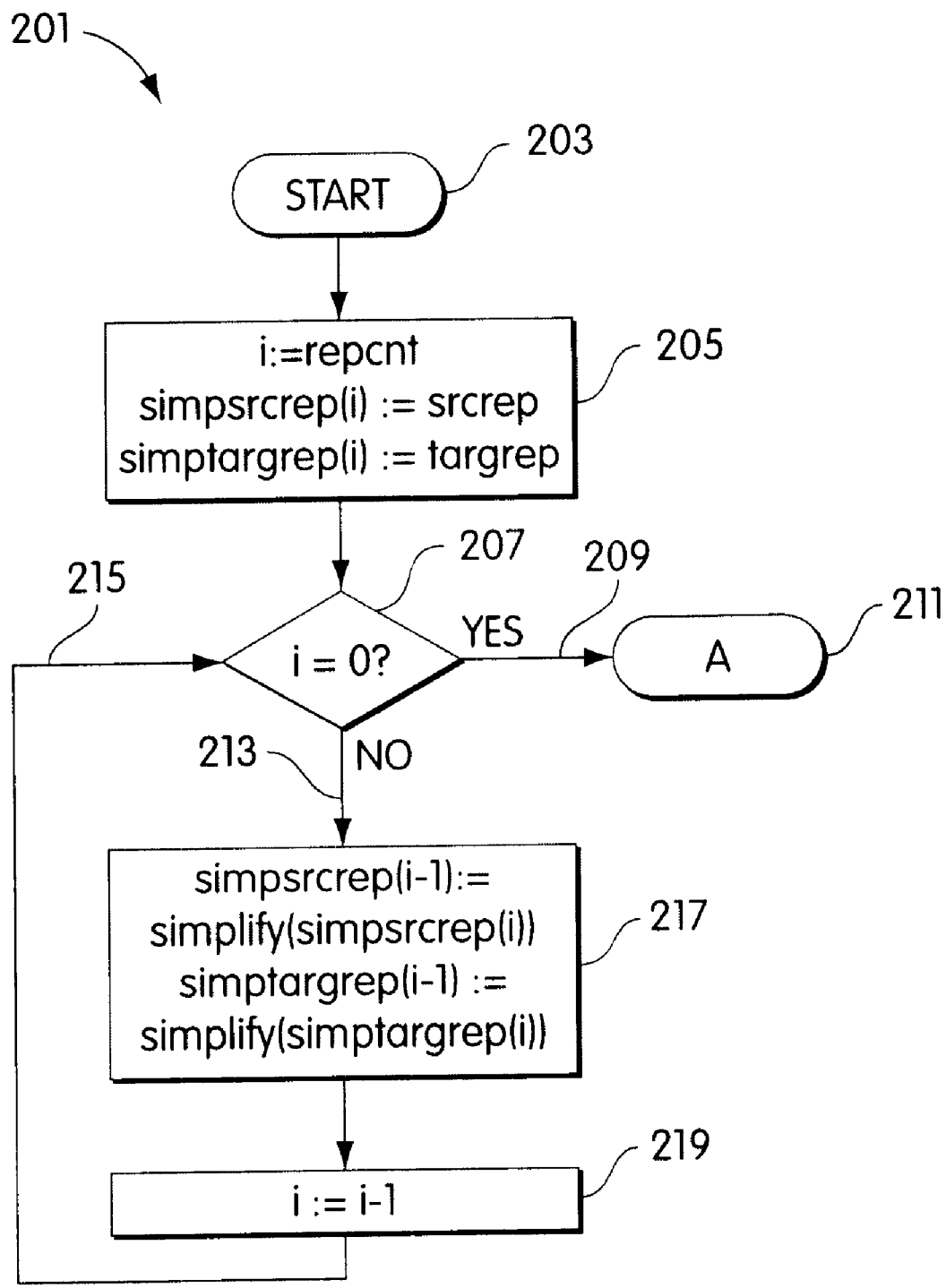
FIG. 2 is a high-level flowchart of representation simplification in a preferred embodiment.

Simplifying the Representations: FIG. 2

As shown above, the first part of the task is done by creating pairs of increasingly simplified representations of the source and target surfaces and beginning with the two most simplified representations, creating a vector field for each pair of representations, with the final vector field being for the representations of the original source and target surfaces. An important feature of the techniques used to make the simplified representations is that the simplifications are data-dependent, that is, the degree of simplification depends on the degree of complexity of the portion of the surface being simplified, with complex portions being simplified less than simpler ones. The simplifications thus tend to preserve the large-scale structural properties of the surface being simplified.

Simplification is shown in more detail in the flowchart of FIG. 2. Simplifier 201 begins at 205 by setting the counter variable i to repcnt, the number of times the representation is to be simplified, simpsrcrep(i), the least simplified source representation, to srcrep, the representation of the source surface, and simptargrep(i), the least simplified target representation, to targrep, the representation of the target surface. Thereupon, simplification loop 215 is entered. Loop 215 produces pairs of ever-simpler representations of the source and target surfaces for a predetermined number of pairs (207). In other embodiments, it may simplify until no further simplification is possible. Simplification is done by the simplify function in box 217, which takes a representation of a surface as an argument. How simplification is done in a preferred embodiment will be explained in more detail below. In each iteration of loop 215, the simplification produced in the preceding iteration is again simplified.

Figure 3:
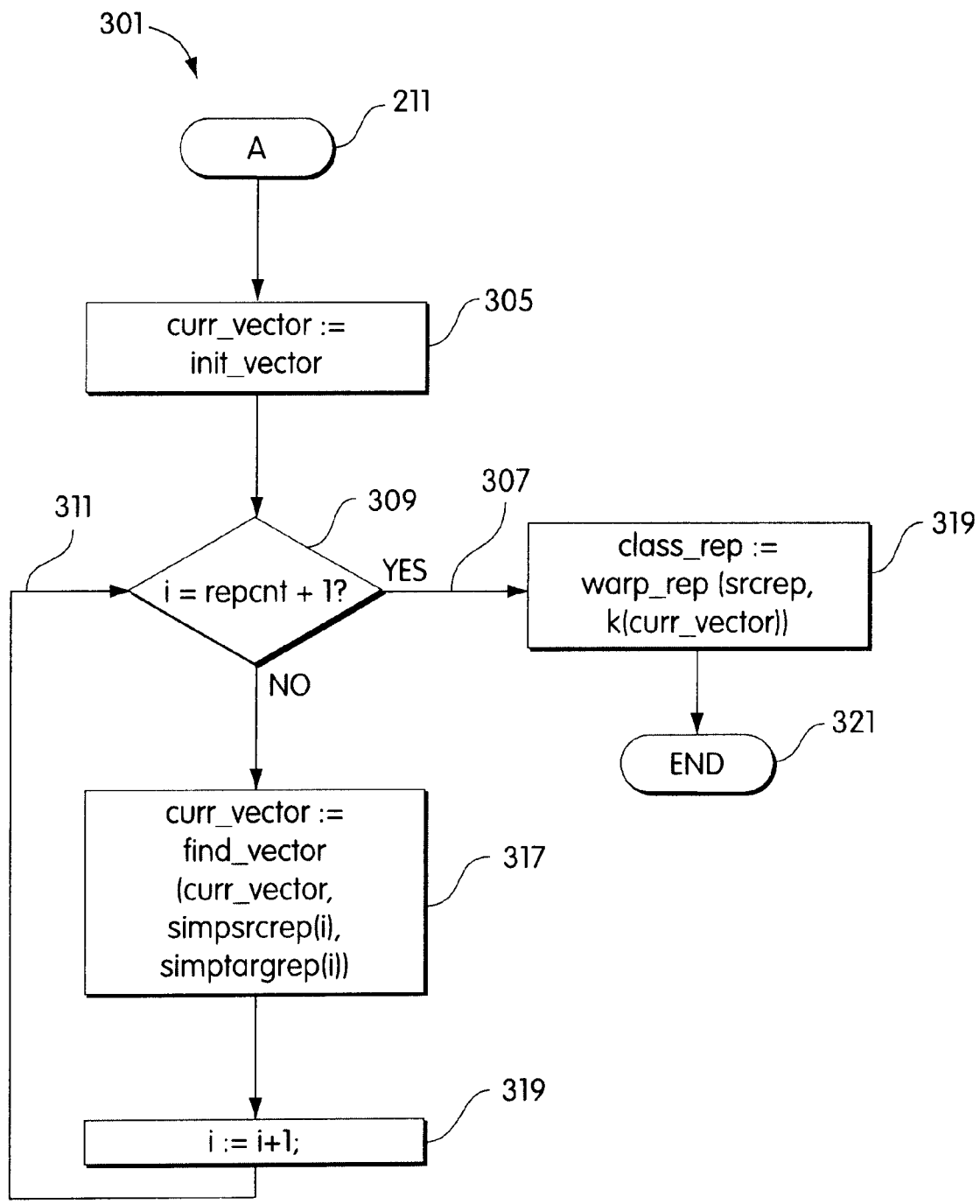
FIG. 3 is a high-level flowchart of automatic vector field computation in a preferred embodiment.

Finding the Best Vector Field: FIG. 3

The second part of the task is creating the vector field, which is done for each of the pairs of representations, beginning with the most simplified pair, by taking a beginning vector field produced by the last vector pair, extending the beginning vector field to produce a vector field that applies to the entire representation of the source member of the pair, and then using the extended vector field as the starting point for finding a vector field that the is better than the extended vector field at producing a family of surfaces that preserve the features of both the source and target members of the pair. As will be explained in more detail below, one way of finding such a vector field is finding one that maximizes the similarity between the warped source surface and the target surface while minimizing the amount by which the source surface is distorted.

The foregoing is shown in more detail in FIG. 3, which shows the processing done after simplifier 201 has produced the pairs of simplified representations. The processing involves two functions: find_vector and warp_rep. find_vector takes as its arguments a vector field, a representation of a source surface, and a representation of a target surface and returns a vector field that is "better" than the argument vector field, that is, the surfaces generated by the returned vector field preserve the properties of both objects better than the ones generated by the argument vector field. find_vector will be explained in more detail below. warp_rep takes a vector field and a representation of a surface and returns a new representation of a surface which is made by applying the vector field to the argument representation. In box 305, curr_vector, which is the vector for the pair of representations currently being processed, is set to an initial vector, init_vector. Then loop 311 is entered, where find_vector is applied to each of the representations produced by simplifier 201 in turn, beginning with the most simplified representations (317) and ending with the original source and target representations. The vector field used in each iteration of the loop is the one produced by find_vector in the previous iteration. When all of the pairs have been thus processed in loop 311, the final vector may be used with warp_rep to produce new members of the class of surfaces that is defined by the source surface and the target surface (319). The final vector may of course be saved for future use in making surfaces of the class defined by the surfaces A and B.

Figure 17:
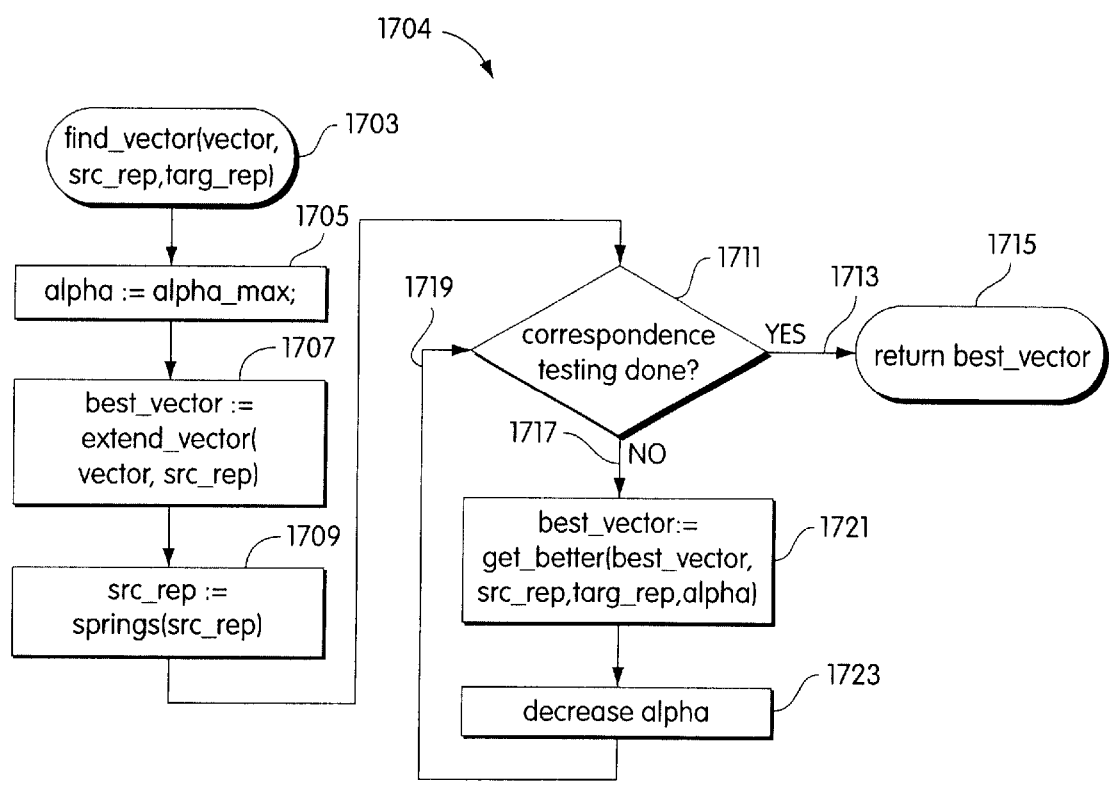
FIG. 17 is a flowchart for the find_vector function.

Finding the Best Vector Field in an Iteration: FIG. 17

FIG. 17 shows the details of find_vector 1701. The best vector field for a given iteration of loop 1721 is the one that is based on the best correspondence between points on the warped source representation of the iteration and points on the target representation of the iteration. In the preferred embodiment, the quality of a correspondence is measured by the similarity of the surface generated by the vector based on the correspondence to the target surface of the iteration and the amount by which the vector based on the correspondence distorts the source representation of the iteration to produce the target surface, with the correspondence improving as the similarity increases and the distortion decreases. The best correspondence, and therefore the best vector, of the iteration, is thus one which maximizes the similarity between the warped source representation of the iteration and the target representation of the iteration while minimizing the amount of distortion of the source representation. find_vector 1701 takes a vector field, a source representation, and a target representation as its arguments. Initialization portion 1704 of find_vector includes boxes 1705–1709. At 1705, the function sets an annealing variable, alpha, to a maximum value, alpha_max. At 1707, it finds a current best vector by extending the vector argument so that it applies to all of src_rep. How this extension is done will be explained in more detail later. At 1709, directional springs are added to the representation of src_rep. As will be explained in more detail later, these make it possible to determine the degree to which src_rep is distorted by a vector.

Loop portion 1719 iterates through a number of reductions in the value of the annealing variable alpha (1723, 1711). At each iteration, the get_better function is executed, as shown at 1721. get_better takes as its arguments the current value of best_vector, src_rep, targ_rep, and the current value of alpha. get_better finds the better correspondence, and therefore the better vector field, by using an energy function which is itself minimized when the similarity between the representation produced using the vector field and the representation of targ_rep is maximized and the degree to which the vector field distorts the representation of src_rep is minimized. In a preferred embodiment, the energy function is minimized using standard gradient-descent techniques. Other minimization techniques will, however, also work. In the preferred embodiment, get_better returns a vector field which is the result of taking best_vector and modifying it so that it is improved by a small amount in the direction of the minimum.

The purpose of the reduction in the annealing variable is to begin the process of finding the best vector with minimizations of the energy function that favor minimization of the amount of distortion over maximization of the similarity between the representation produced by the vector and the target representation. Once such minimizations have been found, the maximization of the similarity can be favored by reducing the value of alpha.

Figure 4:
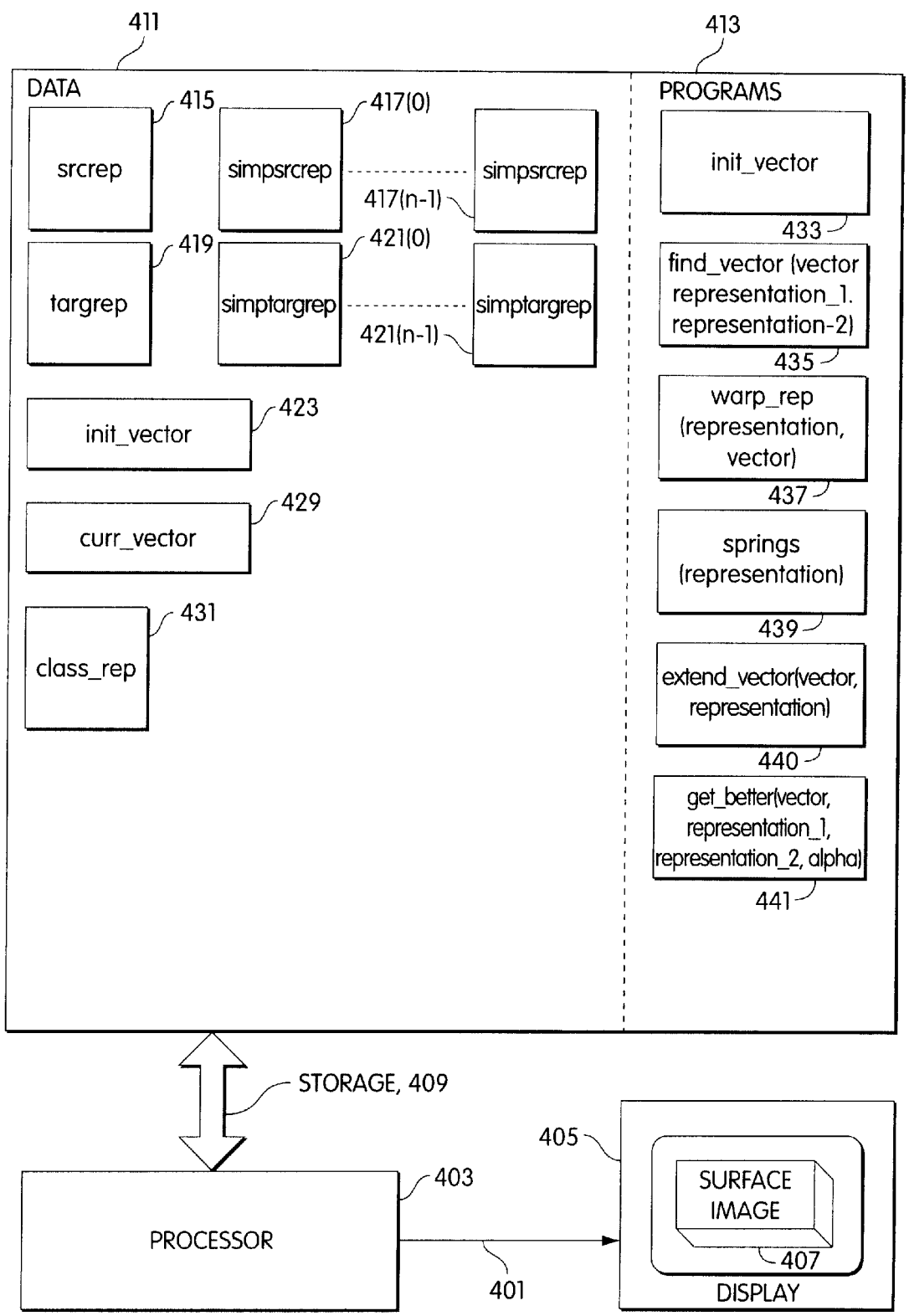
FIG. 4 is a block diagram of a computer system in which the preferred embodiment may be implemented.

An Implementation of the Method in a Computer System: FIG. 4

FIG. 4 shows a computer system 401 that has been set up to implement the method shown in FIGS. 2 and 3. The computer system includes a processor 403, storage 409 for storing data 411 and programs 413 to be executed by processor 403, and an output display 405 for showing images 405 made from representations of surfaces. The data and programs are what one would expect from the discussion of the method: the programs include simplify 433, find_vector 435, warp_rep 437, springs 439, extend_vector 440, and get_better 441. The data includes the original source representation srcrep 415 and original target representation targrep 419, and for each of them, a set of simplifications, simpsrcrep 417(0 . . . n−1) for srcrep 415 and simptargrep 421(0 . . . n−1) for targrep 419. The initial vector field appears as init_vector 439 and the current vector field being processed appears as curr_vector 429 and a representative of the class of surfaces that can be made using the vector field resulting from the method appears as class_rep 431. class_rep 431 can then be employed with many well-known techniques to produce surface image 407 for display on display 405.

System 401 may of course be any kind of computer system which serves the purpose. The techniques described herein have been implemented in Silicon Graphics systems running the IRIX operating system and in an Intel Pentium II system running the Linux operating system.

Figure 5:
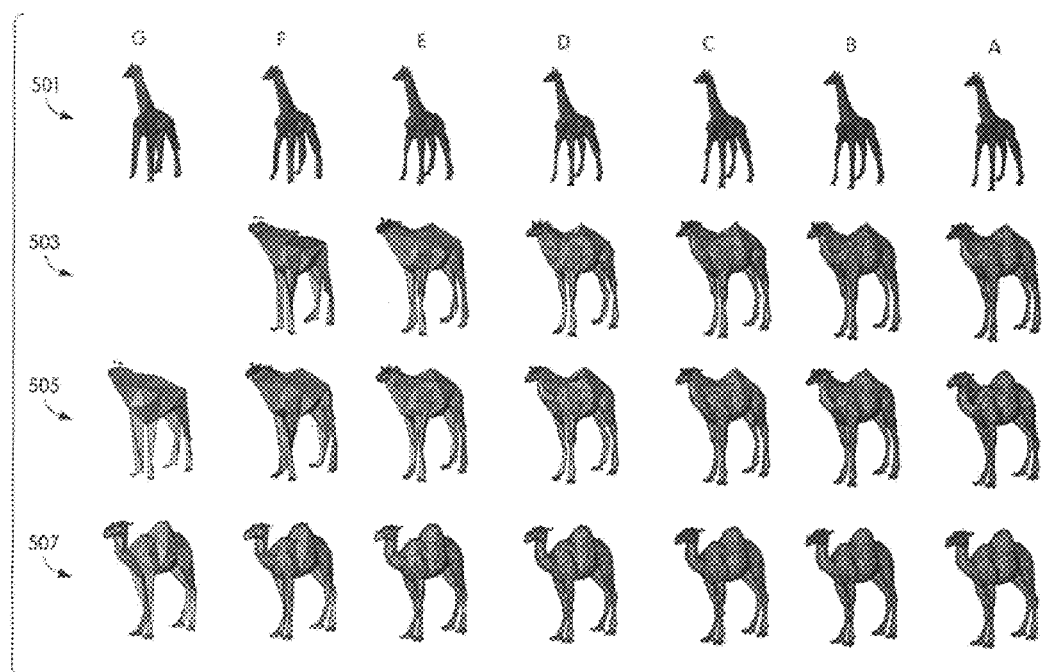
FIG. 5 is an example of representation simplification and vector field computation.

An Example of the Application of the Method: FIG. 5

FIG. 5 shows how the method can be used to produce a vector field which, when applied to a representation of the shape of a giraffe, warps the representation to produce a shape close to that of a camel. FIG. 5 is an array of images produced from representations of shapes. The images in each column of the array are made from representations of shapes that have been simplified to the same degree, with the images in column a not having any simplification at all and the images in column g having the most simplification. The images in row 501 are made from the source representation, simplified as required by the column; the images in row 507 are made from the target representation, again simplified as required by the column. Rows 501 and 507 thus show the results of the operation of simplifier 201. As can be seen from the figures, the surfaces are represented by means of networks which divide the surfaces into triangular planes; on each simplification, the number of triangular planes is halved. As also can be seen from the figures, the simplification technique used in simplifier 201 tends to preserve the large-scale structural properties of the surfaces being simplified.

The images in rows 503 and 505 are made from surfaces that are in turn made by applying a vector field to a surface from which an image in row 501 is made. These images thus show the effect of the processing of flowchart 301. Images 503(f) through 503(a) and 505(g) through 505(a) show the effect of the processing in loop 311. Each of columns f through a represents one iteration. Thus, in column f, the vector field used to produce the surface of image 505(g) from the surface of image 501(g) is extended and applied to the surface of image 501(f) to produce the surface of image 503(f) and the extended vector field is modified so that the surface it produces improves its correspondence with the surface that produced image 507(f). Image 505(f) is the image for the surface produced by the application of the modified vector field to the surface of 501(f), and the modified vector is then used in the next iteration of loop 311 to produce the surface of image 503(e) from the surface of image 501(e). The process continues until a vector field is obtained which can produce the surface of image 505(a) from the surface of image 501(a).

Figure 8:
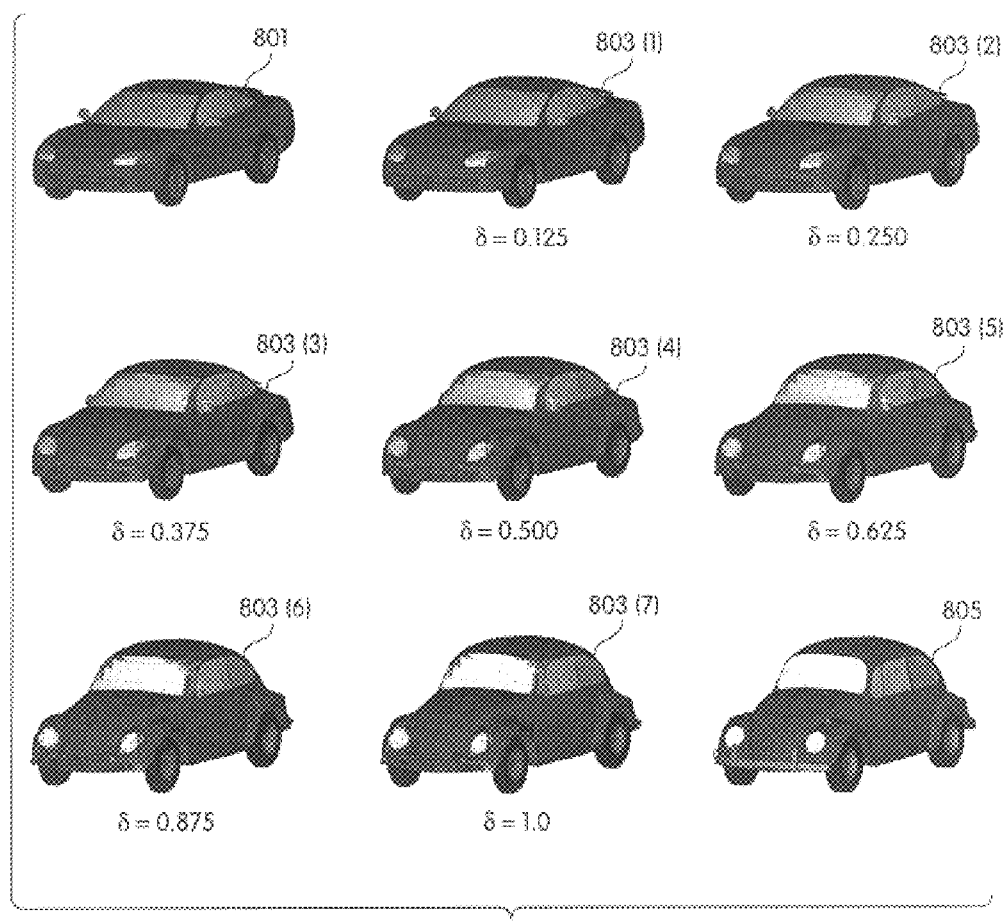
FIG. 8 shows surfaces belonging to a class of automobile surfaces that have been generated using a vector field produced according to the techniques described herein.

Making Surfaces Belonging to the Class of Surfaces Defined by the Source and Target Surfaces: FIG. 8

Once one has a vector field that not only permits the source surface to be transformed into a surface that closely resembles the target surface, but that also preserves the features of both the source and target surfaces, one can use the vector field to generate surfaces belonging to the class of surface defined by the source and target surfaces. If the desired class is bounded by the source and target images, that is, all of the images fall between the source and target images, the surfaces of the class can be produced simply by multiplying the vector field by a constant a whose value has the range $0 \leq \delta \leq 1$. FIG. 8 shows such a set of surfaces belonging to the class bounded by a source surface 801, namely the surface of a 1994 Dodge Stealth sedan, and a target surface 805, namely that of a 1970 Volkswagen "beetle". Surfaces 803(1 . . . 7) are made using increasing values of δ. As the value of a increases, the generated surface comes more and more to resemble the beetle, while maintaining features of the source not found in the target, for example the source's side-mounted mirrors, triangular headlights, and integral bumpers. Of course, if the class is not bounded by source surface 801 or target surface 805, other members of the class may be made by setting $\delta > 1$ and/or $\delta < 0$.

Figure 6:
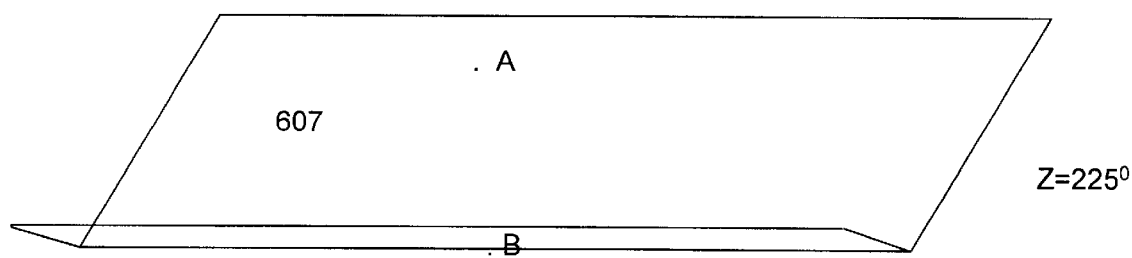
FIG. 6 shows a class of surfaces.
Figure 6:
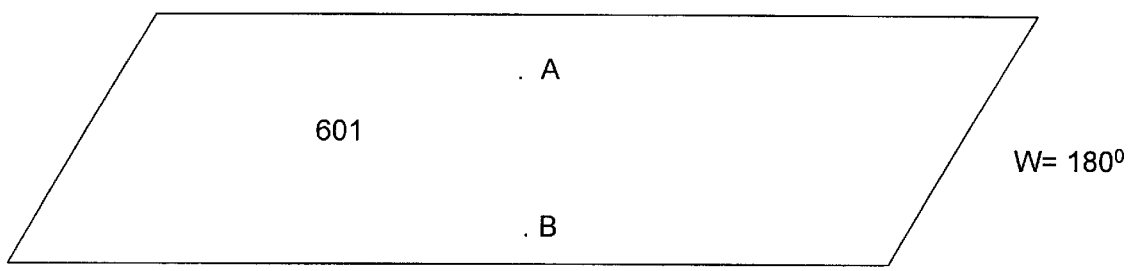
Figure 6:
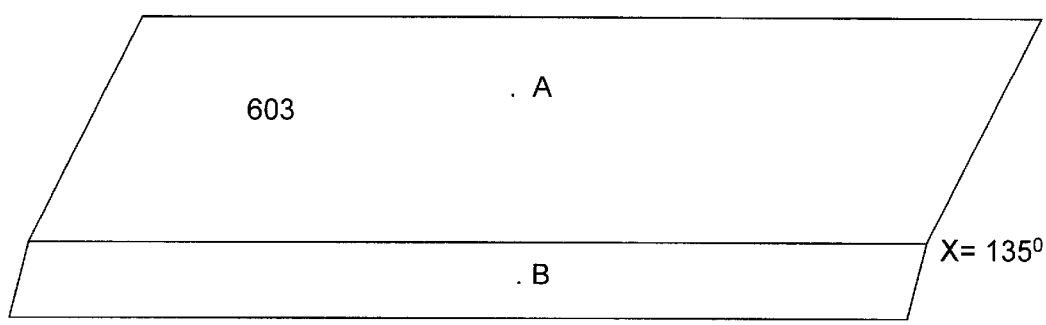
Figure 6:
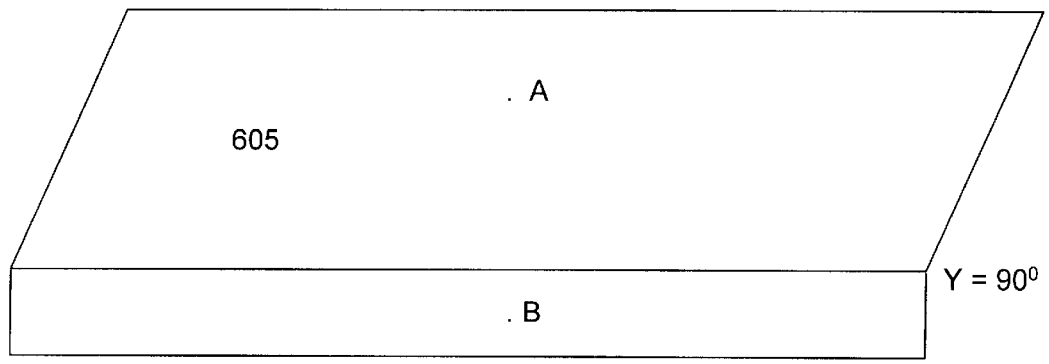
Figure 7:
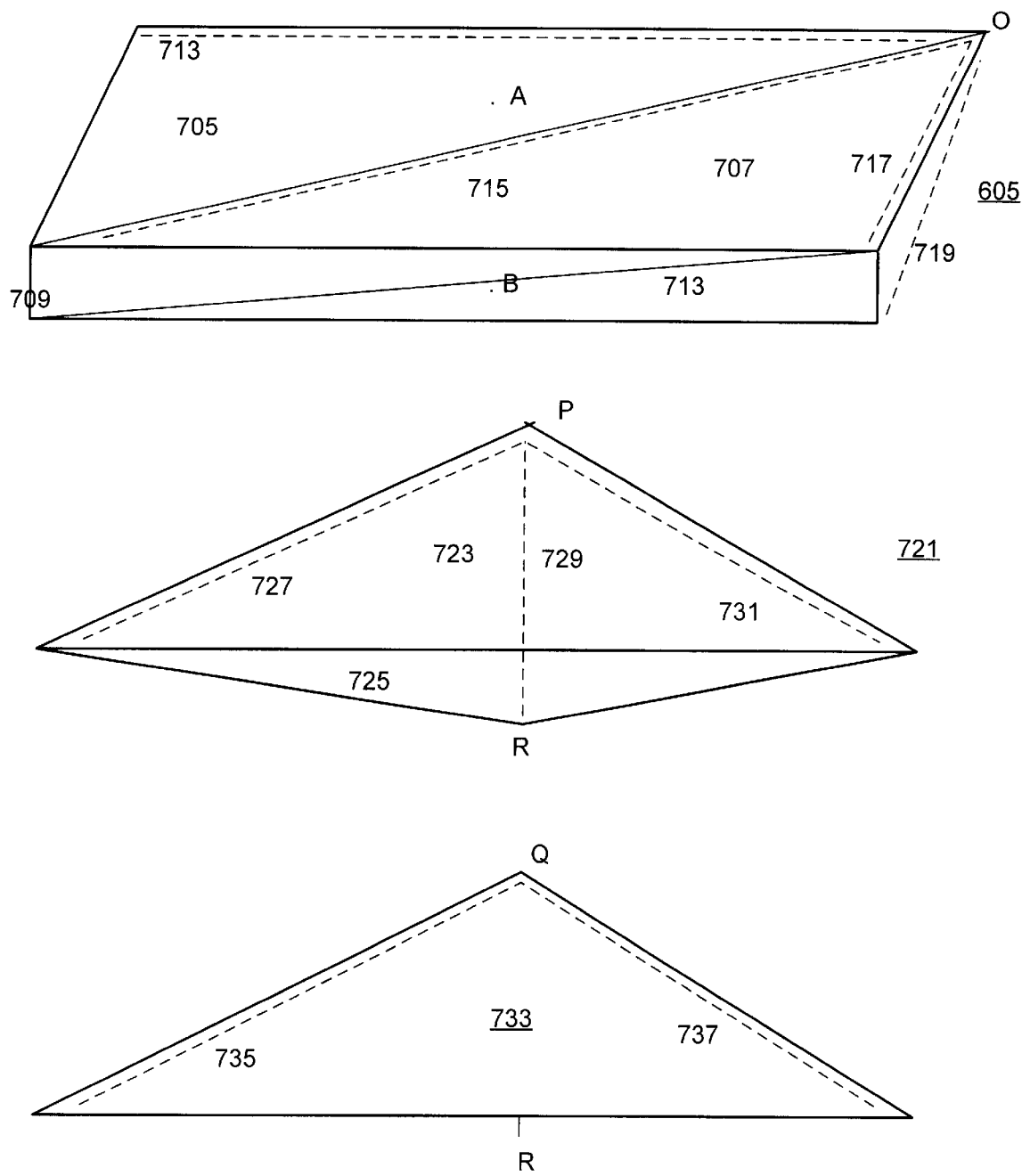
FIG. 7 shows a simplification of a surface of FIG. 6.
Figure 18:
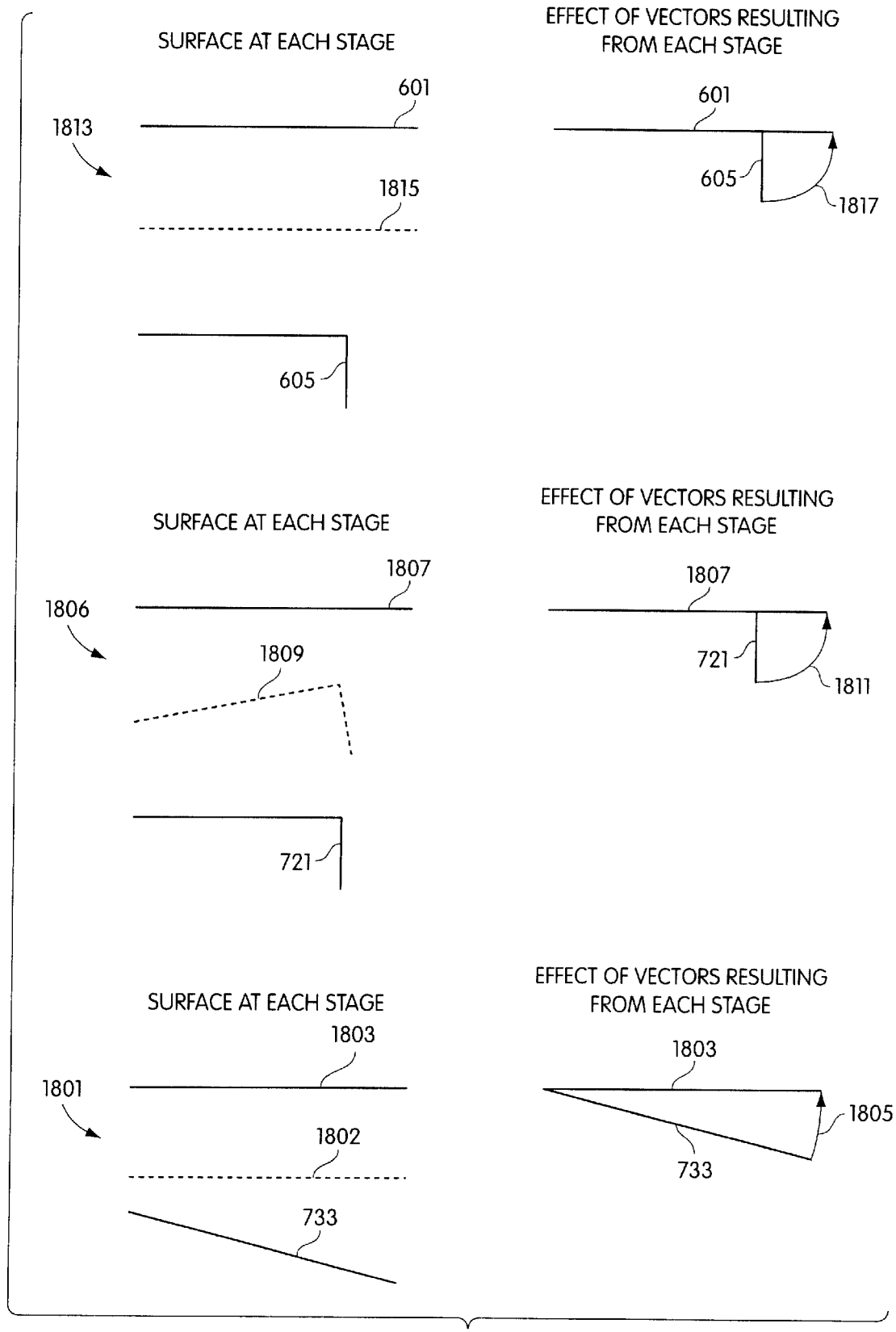
FIG. 18 presents an example of the method.

A Simple Example of the Technique: FIGS. 6, 7, and 18

In the following, a simple example of the technique will be given. FIG. 6 shows a number of surfaces. In the following, the source surface will be surface 605 and the target surface will be 601 and the vector being sought for will produce the class of surfaces bounded by surfaces 605 and 601, that is, a class of surfaces that consists of two planes, with an angle between the planes varying between 90° and 180°. Surface 607 is not a member of the class, since the angle between the planes is larger than 180°.

FIG. 7 shows the simplification of source surface 605. The representation used for surface 605 divides the surface into triangles, as shown in FIG. 7, where each plane of surface 605 is divided into two triangles, giving triangles 705, 707, 709, and 713. At the next level of simplification, shown at 721, each plane of surface 605 is reduced to a single triangle, leaving two triangles 723 and 725, with there being a 90° angle between the triangles. At the third level of simplification, surface 605 is reduced to a single triangular plane 733 which is at a small angle relative to the plane of triangle 723. With regard to the simplification of surface 601, that simplification is not shown, since only one stage of further simplification is possible: namely, the reduction of surface 601 to a single triangle.

FIG. 7 also shows how directional spring functions are used in a preferred embodiment to maintain the structure of the source surface. A directional spring function is a quadratic energy function which is applied to two points and which has the property that the function's value changes as the distance and/or direction of the points relative to each other changes. It can thus measure the amount of distortion that occurs when a vector field is applied to a source surface. Because the directional spring function takes direction as well as distance into account, it preserves structure better than a regular spring function, which, like a real spring, only takes the distance between two points into account. For example, the values of regular spring functions would not be affected by a change in the orientation of the entire surface 605, while the values of directional spring functions would be.

In a preferred embodiment, the points to which directional spring functions are applied are determined as follows for each vertex of the triangles into which the surface is subdivided: for a given vertex, the directional spring function is applied to each of its adjacent vertices. One vertex is adjacent to another if and only if there is some triangle in the representation of the surface to which both vertices belong. Additionally, the directional spring function is applied to any other vertex which is closer to the given vertex than its most distant adjacent vertex. These additional vertices are included to assist in the preservation of small, thin sections of a surface. Thus, vertex O in surface 605 has four directional spring functions (indicated by dashed lines) associated with it: directional spring function 713, directional spring function 715, directional spring function 717, and directional spring function 719.

Vertex P in surface 721 has three directional springs associated with it: spring 727, spring 729, and spring 731, the latter extending from P to R. Vertex Q has two directional springs associated with it, springs 735 and 737.

FIG. 18 shows the stages by which a vector field that will create the class of surfaces bounded by surface 605 and surface 601 is obtained. The figure has two columns: the left-hand column shows cross-sections of the surfaces involved at each stage of obtaining the vector field and the right-hand column shows the effect of the vector field obtained at the stage. In the first stage, 1801, the source surface is surface 733, which is the most simplified version of source surface 605, and the target surface is surface 1803, which is the simplification of surface 601 to a single triangle. As shown in the figure, surface 733 is at an angle to surface 1803. When an initial vector is applied to surface 733, the result is surface 1802, which is in the same plane as surface 1803. This initial vector has the effect shown at 1805, that is, it causes surface 733 to be rotated into the plane of surface 1803. Since both surfaces have been reduced to planes, the initial vector field cannot be further improved.

In the second stage, surface 721 is the source surface. Target surface 1807 still has the same simplification as before, namely a single triangle. When vector field 1805 is applied to surface 721, the result is surface 1809, i.e., the entire surface 721 is rotated. What is wanted, of course, is a vector field which leaves triangle 723 of surface 721 in the same plane as surface 1807 and then rotates triangle 725 between 90° and 180°. The spring functions aid in finding the vector field by keeping the sizes of triangles 723 and 721 the same as they flatten out, thereby ensuring that the bend between the triangles remains in the right place.

In the final stage, surface 601 is the target surface and surface 605 is the source surface. Surface 1815, which results from applying vector field 811 to surface 605, is in the same plane as surface 601, so at this stage, all that needs to be done is to expand vector field 811 so that it covers the points in surfaces 605 and 601 that were not present in the simplified surfaces of the preceding stage. The expanded vector is shown at 1817.

Details of the Technique

The following discussion of the details of the technique will first describe in detail how vector fields are found which preserve the structures of the source and target surfaces and will then describe how to make simplified representations of surfaces that preserve the surfaces' large-scale structural properties and how to extend vector fields; finally, it will be shown that the technique may be applied to surfaces having more than three dimensions, in particular to three-dimensional surfaces for which color is represented by means of additional dimensions.

Finding the Best Vector Field

What we are looking for is the best vector field D, that is the vector field D that best preserves the structure of the source surface while warping it so that the warped source surface closely resembles the target surface. We will find the best vector field D by associating an energy function E(D) with D such that the lower the value of E(D), the better the vector field D. We can thus find the best D by minimizing the value of E(D).

The best D must produce a surface $\vec{D}(A)$ when D is applied to the source surface A that has two qualities. First of all, $\vec{D}(A)$ must have the same shape (or as similar as possible) as B. Secondly, the vector field D must represent a "plausible" movement of the shape of A; we would like D to represent a motion from one surface to the other that preserves the common structures between the two shapes throughout the motion. If we were to apply only half of D to A (i.e. instead of applying the displacements in D to the corresponding vertices, apply ½ of the displacements to the vertices), we would like the resulting shape to appear as similar as possible to both A and B and not to be an arbitrary shape having little relationship to the structure of the two input shapes.

To this end, the energy term describing the quality of a potential solution will have two terms. The first term will measure the similarity of the two surfaces in terms of distance. The second term will measure the changes in the structure of the object.

The Similarity Term

Ultimately, we want every point of $\vec{D}(A)$ to coincide with a point on B and vice-versa. Merely requiring that every point of $\vec{D}(A)$ lie on the surface B is not sufficient as it allows degenerate solutions (e.g. D maps all points to a single point on B). Similarly, only requiring that all points of B lie on $\vec{D}(A)$ will also allow trivial solutions. For a given point p let us define $d_x(p)$ to be the square of the distance from p to the closest point on the manifold X. $d_x(.)$ is a continuous, but not smooth, function over all space. It can be defined as follows:

$$d_x(p) \triangleq \min_{x \in X} \|p - x\|^2$$

Given p, $d_A(p)$ can be efficiently computed for the case where A is composed of a set of triangles by placing the triangles of A in a geometric hash-table.

We might like to compute $$\int_B d_A(b)$$

as a measure of the total distance from the manifold A to the manifold B. Unfortunately, this can take a lot of computation time. Therefore, instead we chose to approximate the integral with a sum over randomly sampled points. If we let $S_n(A)$ be a set of n points sampled uniformly from the manifold A we can let our similarity term be:

$$\sum_{s \in S_n(\vec{D}(A))} d_B(s) + \sum_{s \in S_n(B)} d_{\vec{D}(A)}(s)$$

In practice, we have found that it is best to modify this slightly by adding all of the vertices of $\vec{D}(A)$ and B to the sets of points. Since the vertices are the "most extreme" points on the manifold, it makes sense to insure that their distances are being counted in the sum. Otherwise, this formula tends to "round" the corners of the surfaces. As well, we modify the d(.) function slightly (renaming it d'(.)). This yields the final formula of $$E_{sim}(D) = \sum_{s \in S'_n(\vec{D}(A))} d'_B(s) + \sum_{s \in S'_n(B)} d'_{\vec{D}(A)}(s)$$

where $S'_n(X)$ is the set $S_n(X)$ with the addition of $X_v$. Letting $N_X(x)$ be the normal to the point x on the surface X, d'(.) is $$d'_x(y) \triangleq \min_{x \in X} \left[ \|y - x\|^2 + \rho(1 - ((N_y(y))^T N_x(x))^2) \right]$$

assuming that y is from the surface Y.

The addition of the second term in the definition of d'(.) captures the orientation of the surface at the two points being considered. The square of the inner product of the normals is one if the surfaces are parallel at the point and zero if the surfaces are perpendicular. One minus this term therefore penalizes matching two points on the surfaces whose orientations do not match well.

The Structure Term

In order to assure that the correspondence found isn't arbitrary, we will add a structure term. This term should try to preserve the structure and features of the original shape of the manifold. The term employs directional springs. As already pointed out, a directional spring tries to keep the vector of the difference of its endpoints a constant with a quadratic energy function. Thus, if $a_0$ and $b_0$ are the original endpoints of a directional spring and a and b are the current endpoints of the same directional spring, then the energy associated with that spring is $$\frac{k}{\|a_0 - b_0\|} \|(a_0 - b_0) - (a - b)\|^2$$

The fraction in front is the spring constant divided by the original length of the spring. The denominator insures that springs combine in the proper fashion: we would like the energy associated with one spring of length 2 to be the same as the energy of two springs of length 1 placed end-to-end.

While a spring does not penalize rotation or translation, a directional spring allows only translation without an increase in energy. The reason for our choice of directional springs is that they provide the rigidity necessary and help to preserve the volume of the object. Our energy term (as a whole) will already have enough local minima that it would be implausible for our minimization technique to be able to match arbitrary rotations of an object. Thus, we will give up our ability to match large rotations for the ability to better match the volumetric shape under small rotations.

Our structure term for the energy function will be composed of the sum of energies of directional springs connecting vertices of A. We will add a directional spring from each vertex in A to all adjacent vertices in A (two vertices are adjacent if and only if some triangle of A contains both vertices as vertices of the triangle.). Then, for each vertex in A, we will add directional springs to every other vertex which is closer than the most distant adjacent vertex.

To be more precise, if we let the preposition $ad_A(.)$ evaluate to true if and only if the arguments are adjacent vertices on the surface A, we can write the set of all pairs of vertices on a surface A connected by directional springs as $$C_A \triangleq \{(a,b) | a \neq b \wedge (\exists c)[(ad_A(a,c) \vee ad_A(b,c)) \wedge$$

$$(|a-b| \leq |a-c| \vee |a-b| \leq |b-c|)]\}$$

If we furthermore define $C_A^x$ as $$C_A^x \triangleq C_A \cap \{(a,b) | a = x\}$$

then the energy of the structure term is (taking the sum over the energies of the directional springs)

$$E_{str}(D) = k \sum_{(a,b) \in C_A} \frac{\|(a-b) - (\vec{D}(a) - \vec{D}(b))\|^2}{\|a-b\| |C_A^a|}$$

Figure 9:
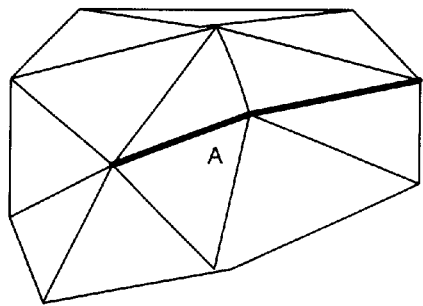
FIG. 9 is a diagram showing why directional spring functions must be normalized.
Figure 9:
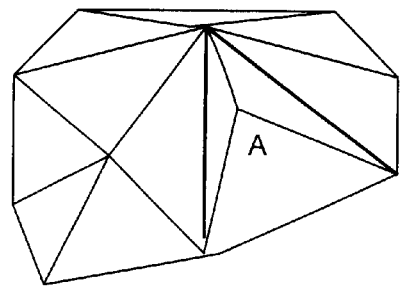

The term $|C_A^a|$ normalizes the relationship between the structural energy contributed by a point on the surface and the number of directional springs connected to that point. Without the term, a point on the surface may contribute more to the structural energy solely because it is connected to more points. The problem is illustrated by the diagrams of FIG. 9. Diagram 901 and diagram 903 clearly define the same surface and both should deform in the same way given the same force on the point marked A in diagram 901. Without the normalizing term, surface 901, which has more connections to point A, would deform more slowly than surface 903, for no reason other than the way in which the surface is triangulated. The normalization does not exactly account for differences in triangulations, but it does an approximate job that has been good enough in practice.

This formula could easily have been written in terms of regular springs. However, tests showed that such an energy term provided far worse results. Since a regular spring has no sense of direction, placing springs along the surface of an object will not, in general, help to keep the shape of the surface intact. Each spring only attempts to keep one end point on a sphere centered around the other end point. This means that if a flat surface is subjected to a compressive force, it will prefer to "buckle" and produce a ridge rather than remain flat and compressed. This is undesirable for most surfaces. Similarly, angles and bends in the surface will not be held in the proper relation to each other to produce the overall surface shape. Each spring is completely local and has no sense of what orientation it should keep relative to the points around it.

The directional springs between points that are not adjacent preserve the volume of the shape and the relative positions of the features. If you consider the cars shown in FIG. 8, the cars' tires and bodies are each independent manifolds. Yet, we would like to try to preserve their relationships to each other and the directional springs between non-adjacent points aid in doing that. Along small thin sections, like the tails of the animals, non-adjacent connections help to preserve the volume on the shape and keep it from collapsing or expanding.

Combining the Similarity Term and the Structure Term

If we combine the two energy terms from above, we end up with $$E(D) = E_{sim}(D) + \alpha E_{str}(D)$$

where $\alpha$ is an annealing parameter that is used to control the tradeoff between matching the objects and preserving the structure. As indicated by $\alpha_i = \eta \alpha_{i-1}$, we will start $\alpha$ off high and gradually anneal, or reduce, its value during the minimization until the two surfaces match well enough. This annealing parameter is common in situations where one would like to minimize one function subject to the minimum of another. In this case, we would like to make $E_{str}$ as small as possible subject to the constraint that $E_{sim}$ is at its global minimum. Clearly the above equation for E does not guarantee it, but it does provide a way of computing a suitable approximation.

We will use gradient descent to minimize E(D). Note that since E(D) already involves a random sampling of the two surfaces, such a minimization already has a stochastic element.

The gradient of $$E(D) = E_{sim}(D) + \alpha E_{str}(D)$$

is the derivative of E with respect to the vector $D_p$ (the vector of D associated with the point p from A). In order to write this derivative, we must first introduce two new definitions. First, we will let $n_a(x)$ be the set of triangles of A which contain x as a vertex (the neighborhood of x). Second, we will let $\vec{d}'(.)$ be defined as $$\vec{d}'_x(y) \triangleq \underset{x \in X}{\operatorname{argmin}}\left[\|y-x\|^2 + \rho(1 - (N_y(y)^T N_x(x))^2)\right]$$

Note that $\vec{d}'_X(y)$ is exactly the same as $d'_x(y)$ except that we are taking the arg min instead of the min.

Figure 10:
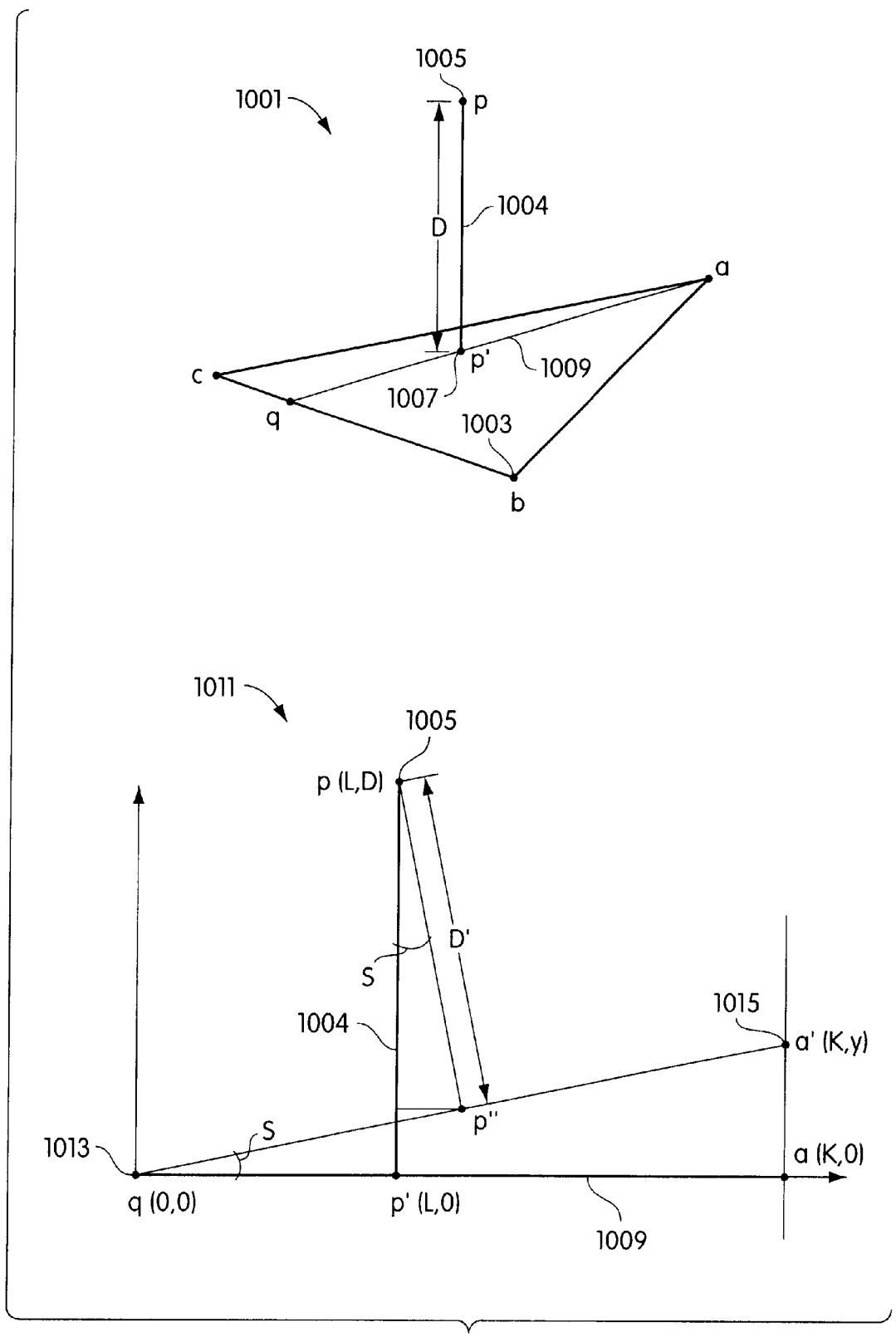
FIG. 10 is a geometric diagram showing the derivation of the values of K and L.

With those definitions out of the way, we can now derive that $$-\frac{d}{dD_p}E(D) \propto \sum_{s \in \left(S'_n(\vec{D}(A)) \cap n_{\vec{D}(A)}(\vec{D}(p))\right)} (\vec{d}'_b(s) - s)\frac{L_{p,s}}{K_{p,s}} +$$

$$\sum_{s \in \left\{s | s \in S_n(B) \wedge \vec{d}'_{\vec{D}(A)}(s) \in n_{\vec{D}(A)}(p)\right\}} (s - \vec{d}'_{\vec{D}(A)}(s))\frac{L_{p,\vec{d}'_{\vec{D}(A)}(s)}}{K_{p,\vec{d}'_{\vec{D}(A)}(s)}} +$$

$$\frac{\alpha k}{|C_A^p|} \sum_{(p,a) \in C_A^p} \frac{(p-a) + (\vec{D}(a) - \vec{D}(p))}{\|p-a\|}$$

where L and K with regard to a given point and a given surface are as shown at 1001 in FIG. 10. The surface is defined by triangle abc 1003, and the point appears as p 1005, which is at distance D on line segment pp' from point p' 1007. A line segment aq passes through a and p. At 1011 in FIG. 10 there is shown a plane defined by the line segments pp' 1104 and aq 1009, with q being at the origin for coordinates in the plane. In the coordinate system of 1011, L is the x coordinate of the points p and p' and K is the x coordinate of a and a'. The appearance of the ratio between L and K in the above derivative reflects the fact that the derivative of the square of the distance D' in plane 1011 decreases as p' approaches q 1013.

Thus, we can minimize E(D) by using the above calculation of the gradient in standard gradient descent techniques. See Christopher M. Bishop, *Neural networks for pattern recognition*, Oxford University Press, 1995, pp. 263–285. We will choose an initial large value for α and gradually reduce it by a constant multiple as indicated above at each iteration of the gradient descent. Initial high values for α will force the algorithm to concentrate on moving A in a consistent fashion. As the algorithm continues and manages to match A to B approximately while keeping the shape roughly the same, α will decrease, allowing the algorithm to concentrate on matching the places that could not be matched before with the higher values of α. The algorithm terminates after a fixed number of iterations or after $\vec{D}(A)$ is "close enough" to B.

Reducing the Complexity of the Representations of the Surfaces

For surfaces of any complexity, it is not practical to compute a vector field D which, when applied to a source surface A will produce a surface $\vec{D}(A)$ which is "close enough" to a target surface B directly from A and B. One reason for this is the sheer number of points that have to be taken into account in the computations; another is that the energy function described above produces too many local minima. As previously pointed out, both of these problems can be solved by beginning with simplified representations of A and B. The simplification reduces the number of points that need to be taken into account and if the simplifications preserve the large-scale structural properties of the surfaces, they will also reduce the number of local minima.

Algorithms for simplifying surfaces are well known in computer graphics, where they are termed polygon reduction algorithms. Some polygon reduction algorithms preserve large-scale structural properties; one such algorithm is Hoppe's progressive mesh technique, described in Hugues Hoppe, "Progressive meshes", *Computer Graphics (SIGGRAPH '96 Proceedings)*, pp. 99–108, 1996. Another is disclosed in Michael Garland and Paul S. Heckbert, "Surface simplification using quadric error metrics", in: *SIGGRAPH '97 Proceedings*, August 1997, also available in November, 1998 at www.cs.cmu.edu/~garland. It is important to note that polygon reduction algorithms in general (and the algorithms of Hoppe and Garland and Heckbert in particular) can give as output meshes which contain no vertices in the same positions as those of the original object.

Using Polygon Pyramids to Reduce Complexity

In order to be able to describe the role of polygon reduction more concretely, we will introduce a little more notation. Considering the polygon reduction algorithm as a black box, if we are given a mesh X with v vertices, we will let $^\beta X$ be the result of running the reduction algorithm on X to produce a mesh with $2^{31\,\beta} v$ vertices. Thus, $^0 X$ is the same as X and $^i X$ has half as many vertices as $^{i-1} X$.

We then use a pyramid of shapes produced by the reduction algorithm from A and B to find the vector field that produces a $\vec{D}(A)$ that is "close enough" to B. The shapes in the pyramid are $\{^0 A, ^1 A, \ldots, ^{l_1} A\}$ and $\{^0 B, ^1 B, \ldots, ^{l_2} B\}$. We start by creating a vector field D which can be applied to $^{l_1} A$ to produce a surface close to $^{l_2} B$. We will denote this vector field as $_{l_2}^{l_1} D$. We then continue producing each $_j^i D$ for successively smaller values of i and j, decrementing i and j by one each time. At each stage i, we apply $^{i-1} D$ that was produced in the previous stage to $^i A$ to produce the surface which is the starting point for finding $^i D$. We continue in this fashion, until we have produced $_j^i D$ for i≦0 and j≦0. Note that if $l_1 \neq l_2$, then we must define $^k X$ to be equal to $^0 X$ for all k<0. This final D will be the vector field which can be applied to A to produce a surface "close enough" to B.

Figure 11:
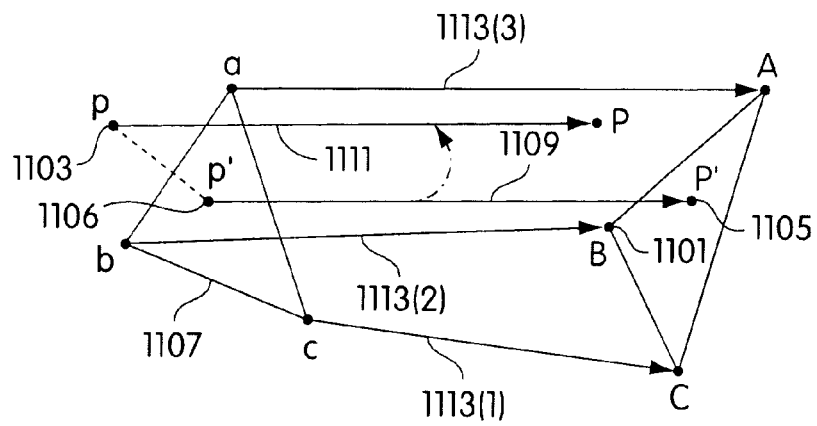
FIG. 11 is a geometric diagram showing how a vector field may be extended to all of space.
Figure 12:
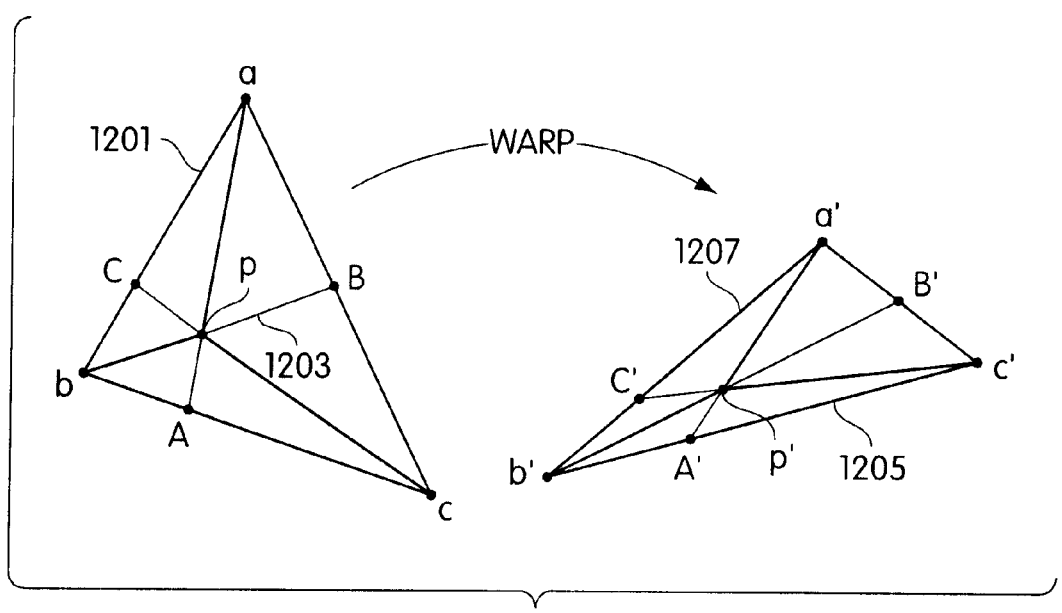
FIG. 12 shows correspondence between warped triangles.

Extending the Vector Field: FIGS. 11 and 12

A requirement for the above algorithm is that $^{i-1} D$ can be used to warp $^i A$ even though $^{i-1} D$ was produced using $^{i-1} A$ and $^{i-1} B$, which have only half as many vertices as $^i A$ and $^i B$. In order to do this, we must extend D so that it can be used to warp the entire space of $^i A$. This is done by first extending D across the faces of $^i A$ and then extending D to points that are not on $^i A$. In overview, extending D across the faces of $^i A$ is done for a given point on $^i A$ by finding the barycentric coordinates for that point and using those coordinates as the weighs for a weighted sum of D at each of the vertices of the triangle containing the given point. The resulting sum is the value of D at this arbitrary point on the face. Extending D to points that are not on $^i A$ is done for a given point by projecting the given point onto the closest triangle and letting the value of D at this arbitrary point in space be the same as the value of D at the projection of the given point on the closest triangle. This is shown in detail in FIGS. 11 and 12.

FIG. 12 shows how D is extended across $^i A$. Namely, given a point, p, on $^i A$, we find the triangle which contains p. We then warp the vertices of the triangle using D. We now have two triangles in correspondence and the point p can be mapped from one to the other as will be explained below. The difference in the two points p' (p warped) and p we will call the extension of D across the surface of $^i A$.

Continuing with FIG. 12, consider the two triangles abc 1201 and a'b'c' 1205. Given that we know the correspondences between the vertices of the two triangles (i.e. a corresponds to a', b to b', and c to c') and given an arbitrary point p 1203 inside of abc 1201, we would like to find the corresponding point, p' 1207, in a'b'c' 1205.

The two triangles need not be similar so finding p' 1207 is not trivial. We would like p' to have the same "relationship" to the vertices of triangle a'b'c' 1205 that p has to the vertices of triangle abc 1201. One example of this relationship would be that if p lies on $\overline{ab}$, then p' should lie on $\overline{a'b'}$, preferably such that the ratio of the lengths of $\overline{ap}$ and $\overline{pb}$ is the same as the ratio of the lengths of $\overline{a'p'}$ and $\overline{p'b'}$. Similarly, if p rests in the middle of abc 1201, p' should also sit in the middle of a'b'c' 1205. To make this more concrete, we shall say that the ratios of the areas of the three subtriangles abp, bcp, and acp to the total area of the triangle abc 1201 should be the same as the corresponding ratios in the "prime" triangle (namely the ratios of a'b'p', b'c'p', and a'c'p' to a'b'c' 1205).

We will define α(p) to be the ratio of the length of $\overline{aA}$ to the length of $\overline{pA}$, β(p) to be the ratio of the length of $\overline{bB}$ to the length of $\overline{pB}$, and γ(p) to be the ratio of the length of $\overline{cC}$ to the length of $\overline{pC}$. α', β', and γ' are similarly defined for p' and a'b'c'. We can then state our constraint on the position of p' as the following system of equations.

$$\alpha(p) = \alpha'(p')$$

$$\beta(p) = \beta'(p')$$

$\gamma(p)=\gamma'(p')$

Since $\alpha$, $\beta$, and $\gamma$ are invariant to warps of the triangle and uniquely define a point on the triangle, we may view these three variables as a warp invariant coordinate system on the triangle. Thus, to warp a point from one triangle to another, we first convert the point from the Cartesian coordinates to the vertex relative coordinates $(\alpha,\beta,\gamma)$ and then perform an inverse mapping back to Cartesian coordinates, but using the new "prime" vertices instead of the original vertices.

The inverse mapping from $(\alpha,\beta,\gamma)$ back to Cartesian coordinates can be accomplished by calculating the intersection of two lines. Note that, given the positions of a',b', and c', knowing $\alpha'$ fixes p' to be on a line parallel to $\overline{b'c'}$ between $\alpha'$ and $\overline{b'c'}$. $\beta$ defines a similar line parallel to $\overline{a'c'}$ and $\gamma$ defines a third line parallel to $\overline{a'b'}$. Provided that these three coefficients sum to 1, the three lines will meet at the single point p'. In practice, it is best to take each pair of lines and find their intersection and then average the three resulting points to get p'.

FIG. 11 shows how D may be extended to cover all of space. Given a point p which does not lie on $^iA$, we find the closest point on $^iA$ to p and use the displacement at this projected point as the displacement for p. In this way, any point can be warped using the displacement field D. Thus, we redefine $\vec{D}(X)$ to be the new, more general, warping which does not require $^iA$ to be the same as the mesh for which D was produced. FIG. 11 shows how this is done. First point p 1103 is projected onto the nearest triangle, abc 1107, to produce p' 1106. The point p' is then mapped to the triangle ABC 1101 using the coordinate transformation just described producing a new point P' 1105. Finally, the difference P'–p' is taken to be the translation vector for the point p. Vector 1109 is the extension of the warp field across the surface and vector 1111 is the extension of the warp field to all space (taken by translating vector 1109, as shown by the dashed arrow). Vectors 1113(1 . . . 3) are the original warp field as defined on the vertices of triangles 1107 and 1101.

Extending the Algorithm from Three Dimensions to Any Number of Dimensions

The algorithm just described can be employed with any number of dimensions. One area in which extending the number of dimensions is useful is adding color to a surface. In general, any number of dimensions can be used to describe color. In computer graphics, color is often parameterized in terms of three quantities since the human eye perceives only three axes of color. Hue-saturation-value, hue-lightness-saturation, and red-green-blue are all well-used axes along which to measure color. The algorithm given below will work well with any of these (or any other) axes for color. The results may, however, differ depending on which set of axes is used, since the conversions among these different color coordinates are non-linear. In these examples, we shall use the red-green-blue coordinate system.

Thus, each vertex now has six values describing its position: x, y, z, red, green, and blue. To place all six dimensions in the same space, we need a conversion factor (or scaling) of color units to spatial units. We will define this to be the color:shape ratio and denote it by the symbol $\gamma$. $\gamma$ is the value by which to multiply the color components to set them in the same units as the spatial components. The units of $\gamma$ are thus distance per energy. $\gamma$ has the natural interpretation in this context of being the relative importance of matching color verses shape. It is a fairly simple parameter to set based on the user's knowledge about the coloring of the surface.

We can now perform the algorithm exactly as described above, except that the geometry will be performed in $\Re^6$ instead of $\Re^3$. But, why is this a good representation for color? Clearly it is simple and mathematically elegant, but that does not mean it will produce correct results. Yet, let us first consider how we would change the algorithm if color were not automatically encoded as three extra dimensions. In the previous algorithm, instead of matching a point to the other surface based solely on spatial distance, we would add a penalty for matching based on the colors of the two points. However, this would not be enough. The color boundaries on surfaces are very important visually and contain a lot of information about the surface; we would like to try to specifically match those as well. Thus, we might sample an extra set of points from along color boundaries and attempt to match those to other color boundaries (again, with a penalty if we could not find a color boundary whose color or orientation exactly matched).

Constructing a surface in $\Re^6$ accomplishes exactly those goals. By matching points in a space which also includes color, we automatically include a natural penalty term for matching two points whose colors don't agree: the squared distance in this six-dimensional space has three terms corresponding to the squared distance in the original three-dimensional space plus three terms which penalize differences in color. More subtly, and more importantly, in constructing a complete surface in $\Re^6$, we add explicit surfaces along the color boundaries which we then must match (this is demonstrated clearly in the next section). These added surfaces are sampled with points just as before and thus lead to a direct mapping of color boundaries. Since we have an explicit term in the energy term for matching orientation of surfaces, this automatically takes into account the different colors along the color boundary and the orientation of the boundary.

As an important extra bonus, by having both color and position in the same coordinate system, the algorithm can change the colors and color boundaries as needed to ensure a match. The algorithm is free to create or remove color boundaries simply by changing the color coordinates of the vertices along with the spatial coordinates. Once again, the structure term of the energy function keeps these changes reasonable.

Figure 13:
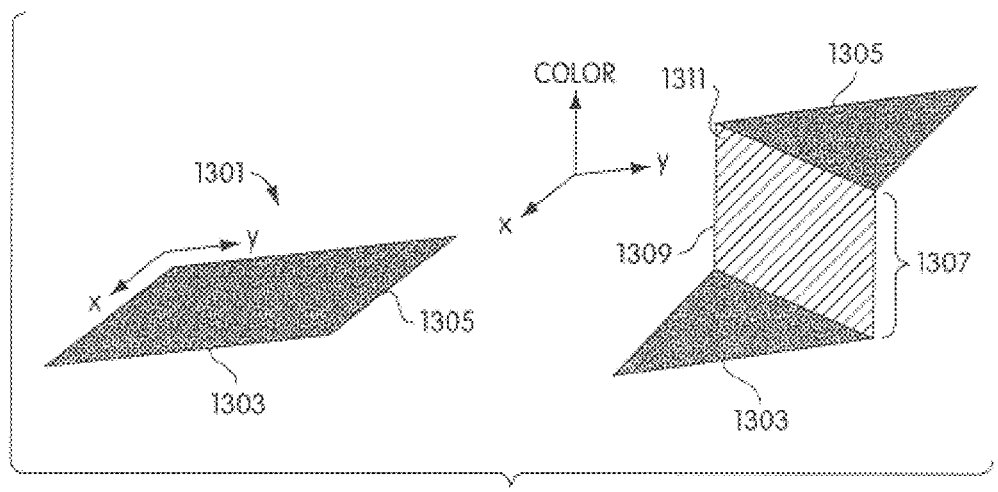
FIG. 13 shows how to use extra dimensions to represent color where the shape has multiple colors.

Representing the Colored Surface: FIG. 13

There are two primary ways of specifying colored surfaces for computer graphics. The easiest case, from our standpoint, is when each vertex is assigned a color. In this case, a point in a polygon is colored based on a linear combination of the colors of the vertices. Thus, our surface already naturally lies in $\Re^6$ and nothing else needs to be done.

The other case is where each polygon has a single color. Therefore, distinct color boundaries exist between polygons of different colors. In this case, if we look at each triangle in the original model and construct a new triangle in our 6D version such that each vertex of the triangle has spatial coordinates as given in the original model and all three vertices have the same color coordinates as the triangle itself, we will be close but not quite done. After "pulling" the vertices into $\Re^6$ by this method, there will now be gaps in the surface where there weren't before. In particular, vertices which previously coincided (since they only had spatial coordinates) will now be distinct if the two triangles from which they came had different colors. This will produce gaps along the lines in the original model where color boundaries were before.

To complete the surface, we add triangles along these gaps. For every color boundary in the original surface, we will add one rectangle (or rather two triangles) whose spatial projection is the line of the color boundary but which stretches the color difference between the vertices on either side. FIG. 13 shows this solution for a simple case. A two-dimensional surface 1301 is made up of two different-colored triangles, 1303 and 1305. When a third dimension representing color is added, a vertex may have only one color and triangles 1303 and 1305 are separated by gap 1307. To fill this gap, a rectangle is added and divided into two triangles, 1309 and 1311. The triangles have a spatial projection of the color boundary on the surface and a color projection of a line from one color to another.

This technique will deal with any situation where no more than three different colors meet at a vertex. When three different colors join, it is sufficient to add a single triangle all of whose vertices share the same spatial coordinates but each of which had different color coordinates. If more than three colors join at a single point, some decision must be made about the connectivity of those colors and the triangles arranged appropriately since, using only planar objects, it is not possible in general to construct a single polygon which will connect all of the colors.

Modifying the Technique to Deal with More Dimensions

The only major difference between working with a two-dimensional surface in $\Re^3$ and a two-dimensional surface in $\Re^6$ that there no longer exists a single normal vector for each surface triangle. Although points can still be projected to the nearest point on the surface, distances and derivatives can be computed as before, and the directional springs continue to provide structure, the definition of d'( ) as used above no longer holds since $N_A(x)$ no longer exists as a single vector.

In general, we would like this technique to extend to arbitrary dimensional surfaces in higher dimensional spaces. Thus, just as we don't want to restrict the algorithm to three-dimensional space, we don't want to restrict it to two-dimensional manifolds either. Returning to the definition of $N_A(x)$, we see that we do not explicitly need a normal but rather just a method of measuring the rotational similarity between two subspaces. We do this with a new operator, $\diamond$, which is a generalization of the scalar product to subspaces. $\diamond$ is defined as follows:

$$A \diamond B \triangleq tr(B^T A A^T B - I) + 1$$

where A and B are matrices of orthonormal columns whose column spaces specify the subspaces to be compared and tr(.) represents the trace of a matrix.

In the equation $$d'_x(y) \triangleq \min_{x \in X}[\|y - x\|^2 + \rho(1 - ((N_y(y))^T N_x(x))^2)]$$

we replace the scalar product of the normals with this new operator and obtain a version of the equation which will work for any dimensional subspace:

$$d'_A(p) \triangleq \min_{a \in A}[\|p - a\|^2 + \rho(1 - V_b \diamond V_a)]$$

where $V_x$ is the matrix of basis vectors describing the linear subspace on which the point x lies on the surface X.

Adding User Input

Sometimes it is not desirable for the algorithm to be completely automatic. Although the best way of incorporating user knowledge about the desired correspondence would be to encode the types of allowable deformation of the surface into the structure term in the energy function (thus changing the generic one given above), sometimes it is easier to specify specific points on the surface and their correspondences. Often the algorithm works for all but a small section of the shape. In this case, it is usually sufficient to mark a few points on each of the source surface A and the target surface B and specify their correspondences.

Let us denote this type of user input as the set $U\{u_1, u_2 \ldots, u_n\}$ where $u_i$ is the pair$(u_i^a, u_i^b)$: $u_i^1$ is a point on A and $u_i^b$ is the corresponding point on B. We incorporate this user input into the energy function by adding a third term $$E_{user} = \zeta \sum_{(u_i^a, u_i^b) \in U} \|\vec{D}(u_i^a) - u_i^b\|^2$$

This essentially adds a spring of zero rest length from each point picked on surface A to the corresponding point on the surface B. The parameter $\zeta$ dictates how rigorously the algorithm will follow the input of the user. Note that when taking the derivative of this new term, the derivative of the summation term involving $u_i^a$ will be spread over the three vertices of the triangle on which $u_i^a$ lies in a similar fashion as the sampled points were in the derivative of $E_{sim}$.

Images

Figure 14:
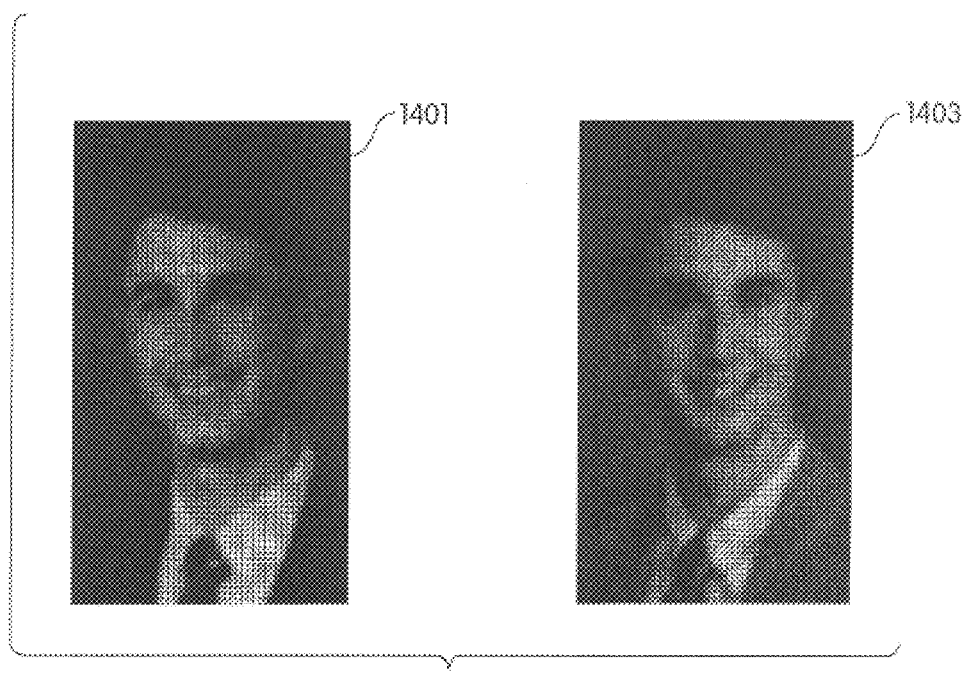
FIG. 14 shows a source image and a target image.
Figure 15:
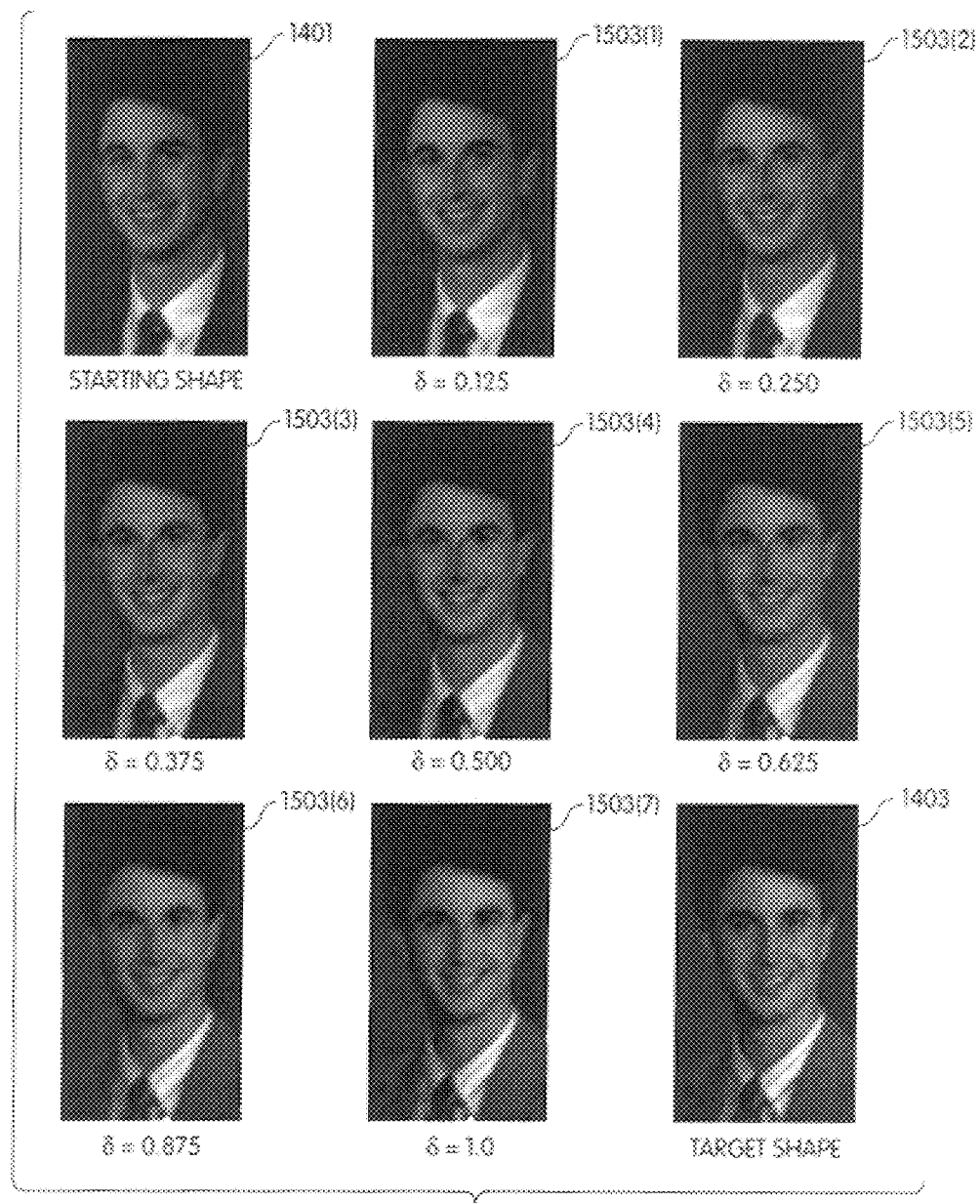
FIG. 15 shows how a vector field made using the techniques described herein may be used to create a set of images that belong to the class defined by the source image and target image.

The techniques described herein for finding vector fields which can be used to generate a class of surfaces that is defined by a source image and a target image can also be applied to images. An image is degenerate form of a colored surface in that it lies in a 2D subspace of $\Re^3$. We took image 1401 and image 1402 of FIG. 14 and used the techniques described above to develop a vector field D which could be used to generate images belonging to the class of images defined by image 1401 and 1403. The results are shown in FIG. 15, where image 1401 is the source image and image 1403 is the target image and images 1503(1 . . . 7) show the results for various settings of the constant parameter $\delta$ by which vector field D is multiplied.

Figure 16:
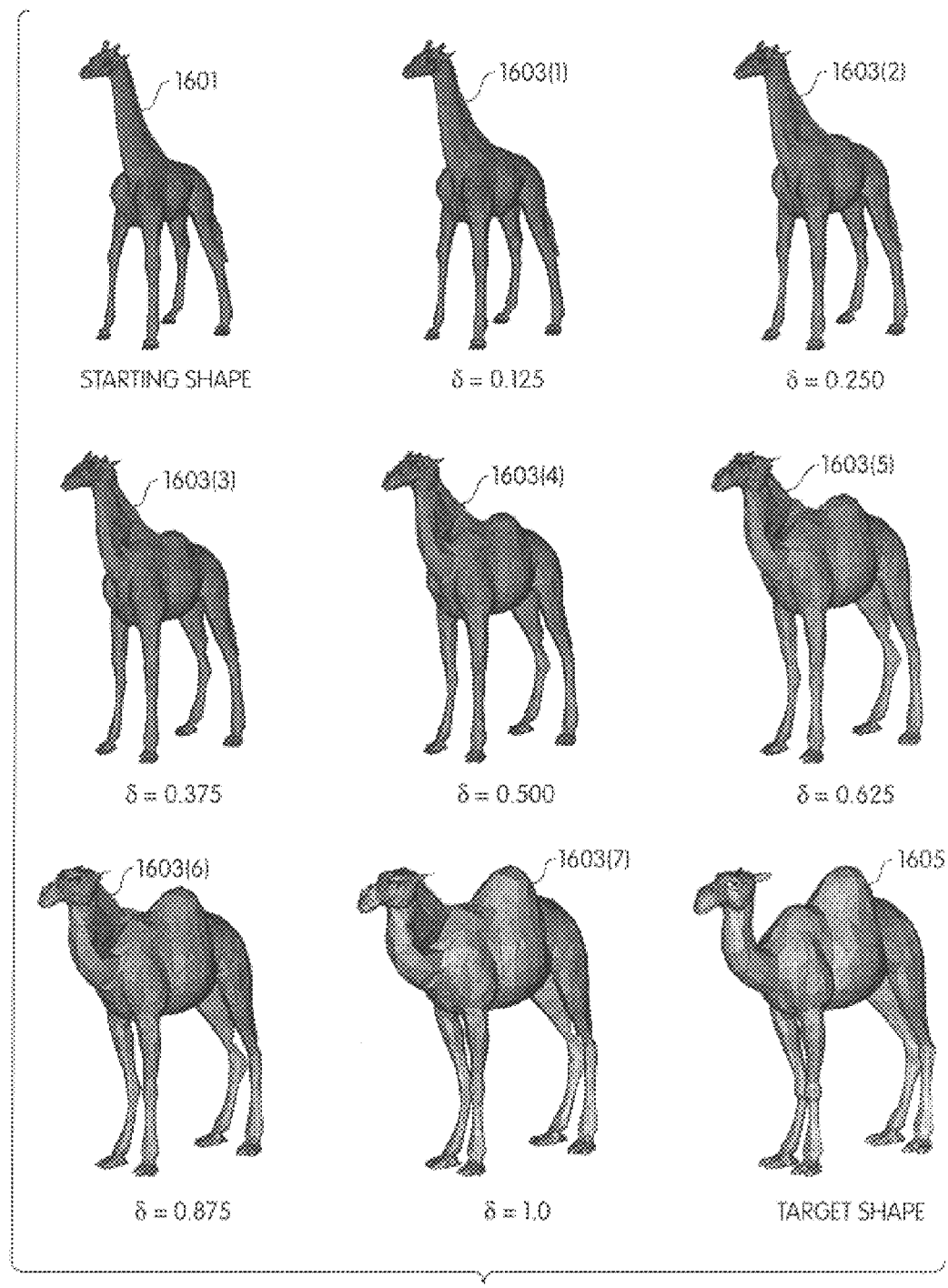
FIG. 16 shows how a vector field made using the techniques described herein may be used to create a class of shapes that are defined by the shape of a giraffe and the shape of a camel.

Parameter Settings: FIGS. 8 and 16

As has been clear from the foregoing discussion, the behavior of the energy minimization algorithm used to find E(D) relative to a target surface for a candidate surface that has been generated by D from a source surface depends on a number of parameters. The following table lists the parameters and shows the settings of the parameters used to generate the vector fields that are employed to create the morphs shown in FIGS. 8 and 16. FIG. 8 has already been explained; FIG. 16 shows the effect of the application of the vector field that was created by the process shown in FIG. 5. The source surface is the giraffe shown at 1601; the target surface is the camel shown at 1605; the surfaces shown at 1603(1 . . . 7) are the result of multiplying the vector field by the values of $\delta$ shown under the surfaces. There were no user-specified correspondence points employed in FIG. 8; 11 user-specified correspondence points were employed for the animals of FIG. 16: a correspondence point for each ear, eye, and foot, one for the nose, one for the end of the tail, and one for the start of the tail. The parameters and their values are:

| Parameter | Description | Vals. in FIG. 8 | Vals. in FIG. 16 |
|---|---|---|---|
| $\gamma$ | color:shape ratio | 5.0 | 1.0 |
| $a_0 \cdot k$ | starting spring constant | 50.0 | 50.0 |
| $\eta$ | spring constant annealing rate | 0.9988 | 0.995 |
| n | number of sampled points | 3000 | 3000 |
| $\rho$ | orientation weighting | 1.0 | 1.0 |
| $\zeta$ | user-controlled spring strength | N/A | 1.0 |
| t | number of gradient steps | 400 | 100 |
| $t_0$ | number of steps on last level | 4000 | 1000 |
| $\epsilon$ | gradient step size | 0.0005 | 0.0005 |

At each level of the pyramid of representations, we take t steps in which we search for improved correspondence, with the gradient step size set to $\epsilon$, except at the level of the original source and target surfaces, where $t_0$ steps are taken to compute $_0{}^0D$.

CONCLUSION

The foregoing Detailed Description has disclosed to those skilled in the relevant disciplines the best mode presently known to the inventors of making vector fields which may be applied to a source surface to generate surfaces that belong to a class of surfaces defined by the source surface and a target surface. An important property of the vector fields produced by the techniques disclosed herein is that they are based on correspondences between the source surfaces and the target surfaces such that surfaces belonging to the class of surfaces generated by the vector field tend to preserve the characteristics of both the source and target surfaces. In a preferred embodiment, the correspondences upon which the vector fields are based are found using simplifying techniques which preserve the large-scale structural properties of the source and target surfaces and techniques for finding correspondences that favor correspondences such that vector fields based on them generate surfaces in which distortion of the source surface is minimized while similarity to the target surface is maximized. The Detailed Description has disclosed the particular techniques used by the inventors to generate their vector fields, but those skilled in the relevant disciplines will realize that other techniques may achieve the same ends. In particular, any simplification technique may be employed which preserves the surfaces' large-scale structural properties and any technique for finding the best vector may be used which finds vectors that preserve the features of both the source and target surfaces. Further, as is explicitly pointed out in the Detailed Description, the technique is not limited in its application to images or 3-dimensional surfaces, but may be applied to any manifold, and may further be used to deal with colored surfaces and images.

For all of the foregoing reasons, the Detailed Description is to be regarded as being in all respects exemplary and not restrictive, and the breadth of the invention disclosed here in is to be determined not from the Detailed Description, but rather from the claims as interpreted with the full breadth permitted by the patent laws.

What is claimed is:

1. Apparatus used in a data processing system to make a representation of a member object, the member object being further processable in the data processing system, the member object being represented using n dimensions where n>2, and the member object being a member of a class thereof which is defined by a source object and a target object, the apparatus comprising:

a vector field which is stored in storage apparatus accessible to the data processing system and which is generated by making a set of pairs of increasingly simplified representations of the source and the target objects by executing a first function in the data processing system, the simplified representations being made in a manner that tends to preserve large-scale structural properties of the source and target objects, and thereupon finding the vector field by executing a second function in the data processing system on the pairs of representations in order of decreasing simplification, the second function finding a pair vector field for each pair by measuring structural change between a first representation of a pair and a generated representation produced by applying a candidate pair vector field to the first representation and selecting the candidate pair vector field which minimizes structural change between the first representation and the generated representation and maximizes similarity between the generated representation and the second representation; and an object generator function which is stored in the storage apparatus and executed in the data processing system, the object generator function modifying the vector field and applying the modified vector field to a representation of the source object to generate a representation of the member object that is stored in the storage apparatus and is processable in the data processing system.

2. The apparatus set forth in claim 1 wherein:

the pairs of representations include an original representation of the source object and an original representation of the target object.

3. The apparatus set forth in claim 1 wherein:

the found vector field is the pair vector field for the pair made up of the least simplified source object and the least simplified target object.

4. The apparatus set forth in claim 1 wherein:

the second function further makes an extended pair vector field from the pair vector field that applies to the next pair's source object representation and uses the extended pair vector field to find the next pair's pair vector field.

5. The apparatus set forth in claim 1 wherein:

the second function minimizes changes in structure between the pair's source object representation and the pair's generated object representation by minimizing distortion of the pair's source object representation to produce the pair's generated object representation.

6. The apparatus set forth in claim 5 wherein:

the second function further associates directional spring functions with pairs of points in the pair's source object representation and the second function minimizes distortion by minimizing changes in the directional spring functions.

7. The apparatus set forth in claim 1 wherein:

the object generator modifies the vector field by multiplying the vector field by a constant k.

8. The apparatus set forth in claim 7 wherein:

$0 \leq k \leq 1$, whereby the class is bounded by the source object and the target object.

9. The apparatus set forth in claim 1 wherein:

at least some of the n dimensions represent color.

10. The apparatus set forth in claim 9 wherein:

a dimension representing a color is related to a spatial dimension by means of a color-shape ratio, the color-shape ratio determining an extent to which the generated member object tends to preserve color features of both the source and target objects.

11. The apparatus set forth in claim 1 wherein:

the source object and the target object are images.

12. A data storage device characterized in that:

the data storage device contains program code and data such that execution of the program with the data on a computer system, implements the apparatus set forth in claim 1.

13. Apparatus used in a data processing system to make a vector field which, when applied in the data processing system to a source object contained in storage apparatus accessible to the data processing system generates a generated object that is similar to a target object and that is processable in the data processing system, the apparatus comprising:

a simplifier function contained in the storage apparatus which, when executed in the data processing system, makes a set of pairs of increasingly simplified representations of the source and target objects in the storage apparatus, the simplified representations being made in a manner that tends to preserve large-scale structural properties of the source and target objects; and a vector field finder function contained in the storage apparatus which, when executed in the data processing system on the pairs of representations in order of decreasing simplification, finds the vector field by finding a pair vector field for each pair, the pair vector field being found by measuring structural change between a first representation of a pair and a generated representation produced by applying a candidate pair vector field to the first representation and selecting the candidate pair vector field which minimizes structural change between the first representation and the generated representation and maximizes similarity between the generated representation and the second representation.

14. The apparatus set forth in claim 13 wherein:

the vector field finder function uses a set of user-supplied points that correspond on the source object and target object in finding the vector field.

15. The apparatus set forth in claim 14 wherein:

the vector field finder function uses the set of user-supplied points by associating a user-supplied point in the source object and its corresponding user-supplied point in the target object with a directional spring function, the found vector field being one which generates a generated object such that changes in the directional spring function associated with the corresponding point are minimized.

16. The apparatus set forth in claim 13 wherein:

for a given pair, the vector field finder function finds an initial vector field for the given pair by extending the next more simplified pair's pair vector field to the given pair's source object representation and uses the pair's initial vector field to find the pair vector field for the given pair.

17. The apparatus set forth in claim 16 wherein:

the vector field finder associates directional spring functions with pairs of points in the pair's source object representation; and the pair's pair vector generates a generated object representation for the pair such that changes in the directional spring functions are minimized.

18. The apparatus set forth in claim 13 wherein:

the least simplified pair of representations are an original representation of the source object and an original representation of the target object; and the vector field is the pair vector field which the vector field finder finds using the original representation of the source object and the original representation of the target object.

19. The apparatus set forth in claim 13 wherein:

at least some of the n dimensions represent color.

20. The apparatus set forth in claim 13 wherein:

the source object and the target object are images.

21. A data storage device characterized in that:

the data storage device contains program code and data such that execution of the program with the data on a computer system, implements the apparatus set forth in claim 13.

22. Apparatus used in a data processing system to make a vector field which may be used in the data processing system to generate a generated object from a first object stored in storage apparatus accessible to the data processing system, the generated object also being stored therein and being processable in the data processing system and being similar to a second object, and all of the objects being represented using n dimensions where n>2, the apparatus comprising:

one or more first functions stored in the storage apparatus that are executed in the data processing system and measure structural change in the first object; and a vector field finder function stored in the storage apparatus that, when executed in the data processing system, finds a vector field such that similarity between the generated object and the second object is maximized and structural change of the first object as measured by the first functions is minimized.

23. The apparatus set forth in claim 22 wherein:

the vector field finder function finds the vector field by minimizing an energy function that is applied to the vector field, the energy function being minimized when the similarity between the generated object and the second object is maximized and structural change as measured by the first functions is minimized.

24. The apparatus set forth in claim 22 wherein:

the first functions are directional spring functions for pairs of points in the representation of the first object.

25. The apparatus set forth in claim 24 wherein:

the representation of the first object includes a mesh of triangles representing a surface; and a given vertex of a triangle in the representation of the first object has associated therewith spring functions connecting the given vertex to adjacent vertices of the given vertex and to any other vertex on the surface which is closer to the given vertex than the most distant adjacent vertex.

26. A data storage device characterized in that:

the data storage device contains program code and data such that execution of the program with the data on a computer system, implements the apparatus set forth in claim 22.

27. A method employed in a data processing system to make a representation of a member object, the member object being further processable in the data processing system, the member object being represented using n dimensions where n>2, and the member object being a member of a class thereof which is defined by a source object and a target object, the method comprising the steps of:

modifying a vector field, the vector field being generated in the data processing system by executing a first function that makes a set of pairs of increasingly simplified representations of the first object and a second object, the simplified representations being made in a manner that tends to preserve large-scale structural properties of the first and second objects, and thereupon finding the vector field by executing a second function on the pairs of representations in order of decreasing simplification, the second function finding a pair vector field for each pair by measuring structural change between a first representation of a pair and a generated representation produced by applying a candidate pair vector field to the first representation and selecting the candidate pair vector field which minimizes structural change between the first representation and the generated representation and maximizes similarity between the generated representation and the second representation; and applying the modified vector field to a representation of the source object stored in storage apparatus in the data processing system to generate a representation of the member object that is storable in the storage apparatus.

28. A method employed in a data processing system to make a vector field which, when applied to a first object that is contained in storage apparatus accessible to the data processing system, generates a generated object that is further processable in the data processing system, the method comprising the steps of:

making a set of pairs of increasingly simplified representations of the first object and a second object by executing a first function in the data processing system, the simplified representations being stored in the storage apparatus and being made in a manner that tends to preserve large-scale structural properties of the first and second objects, and finding the vector field by executing a second function in the data processing system on the pairs of representations in order of decreasing simplification, the second function finding a pair vector field for each pair by measuring structural change between a first representation of a pair and a generated representation produced by applying a candidate pair vector field to the first representation and selecting the candidate pair vector field which minimizes structural change between the first representation and the generated representation and maximizes similarity between the generated representation and the second representation.

29. The method set forth in claim 28 wherein:

the pairs of representations include an original representation of the first object and an original representation of the second object.

30. The method set forth in claim 28 wherein the step of finding the vector field wherein: and the found vector field is the pair vector field for the pair made up of the least simplified first object and the least simplified second object.

31. The method set forth in claim 30 wherein the step of finding the vector field includes the steps of:

making an extended pair vector field from the pair vector field that applies to the next pair's first object representation and using the extended pair vector field to find the next pair's pair vector field.

32. The method set forth in claim 30 wherein:

changes in structure between the pair's first object representation and the pair's generated object representation are minimized by minimizing distortion of the pair's first object representation to produce the pair's generated object representation.

33. The method set forth in claim 32 wherein:

the step of finding the pair vector field for each pair includes the steps of associating directional spring functions executable in the computer system with pairs of points in the pair's source object representation and distortion is minimized by minimizing changes in the directional spring functions.

34. The method set forth in claim 27 wherein:

the vector field is modified by multiplying the vector field by a constant k.

35. The method set forth in claim 34 wherein:

$0 \leq k \leq 1$, whereby the class is bounded by the first object and the second object.

36. The method set forth in claim 27 wherein:

at least some of the n dimensions represent color.

37. The method set forth in claim 36 wherein:

a dimension representing a color is related to a spatial dimension by means of a color-shape ratio, the color-shape ratio determining an extent to which the generated member object tends to preserve color features of both the first and second objects.

38. The method set forth in claim 27 wherein:

the first object and the second object are images.

39. A data storage device characterized in that:

the data storage device contains program code and data such that execution of the program with the data on a computer system, implements the method set forth in claim 27.

40. A method employed in a data processing system to make a vector field which, when applied to a first object stored in storage apparatus in the data processing system, generates a generated object that is also stored therein, is processable in the data processing system, and is similar to a second object, all of the objects being represented using n dimensions where n>2, the method comprising the steps of:

applying one or more functions executable in the computer system that measure structural change to the first object; and finding a vector field such that similarity between the generated object and the second object is maximized and structural change of the first object as measured by the functions is minimized.

41. The method set forth in claim 40 wherein:

the step of finding the vector field includes the step of minimizing an energy function that is applied to the vector field, the energy function being minimized when the similarity between the generated object and the second object is maximized and structural change as measured by the functions is minimized.

42. The method set forth in claim 40 wherein:

the functions are directional spring functions for pairs of points in the representation of the first object.

43. The method set forth in claim 42 wherein:

the representation of the first object includes a mesh of triangles representing a surface; and the method includes the step of associating spring functions with a given vertex of a triangle in the representation of the first object, the associated spring functions connecting the given vertex to adjacent vertices of the given vertex and to any other vertex on the surface which is closer to the given vertex than the most distant adjacent vertex.

44. A data storage device characterized in that:

the data storage device contains program code and data such that execution of the program with the data on a data processing system implements the method set forth in claim 40.

* * * * *